United States Patent
Mammou et al.

(10) Patent No.: US 12,387,415 B2
(45) Date of Patent: *Aug. 12, 2025

(54) COMPRESSION OF ATTRIBUTE VALUES COMPRISING UNIT VECTORS

(71) Applicant: Apple Inc., Cupertino, CA (US)

(72) Inventors: Khaled Mammou, Danville, CA (US); Deepak S Tolani, Sunnyvale, CA (US); Alexandros Tourapis, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/507,377

(22) Filed: Nov. 13, 2023

(65) Prior Publication Data
US 2024/0078738 A1 Mar. 7, 2024

Related U.S. Application Data

(63) Continuation of application No. 17/663,820, filed on May 17, 2022, now Pat. No. 11,854,112.

(60) Provisional application No. 63/197,288, filed on Jun. 4, 2021.

(51) Int. Cl.
| | |
|---|---|
| *G06T 15/04* | (2011.01) |
| *G06T 9/00* | (2006.01) |
| *G06T 11/40* | (2006.01) |
| *G06T 15/08* | (2011.01) |
| *G06T 17/20* | (2006.01) |

(52) U.S. Cl.
CPC ............ *G06T 15/04* (2013.01); *G06T 9/00* (2013.01); *G06T 11/40* (2013.01); *G06T 15/08* (2013.01); *G06T 17/20* (2013.01)

(58) Field of Classification Search
None
See application file for complete search history.

(56) References Cited

U.S. PATENT DOCUMENTS

| | | |
|---|---|---|
| 7,271,377 B2 | 9/2007 | Mueller et al. |
| 11,276,203 B2 | 3/2022 | Tourapis et al. |
| 11,284,091 B2 | 3/2022 | Tourapis et al. |

(Continued)

FOREIGN PATENT DOCUMENTS

WO 20060696162 9/2006

OTHER PUBLICATIONS

U.S. Appl. No. 17/663,820, filed May 17, 2022, Khaled Mammou et al.

*Primary Examiner* — Nurun Flora
(74) *Attorney, Agent, or Firm* — Alexander A. Knapp; Kowert, Hood, Munyon, Rankin & Goetzel, P.C.

(57) ABSTRACT

A system compresses and decompresses attribute information for visual volumetric content, such as a mesh representation. Attribute values are included in the visual volumetric representation, wherein at least some of the attribute values include unitary vectors, such as surface normal vectors or surface tangent vectors having a magnitude of one unit. In order to compress the attribute information the three-dimensional unit vectors are mapped into two dimensional parametric coordinates for a planar representation of a unit sphere. To reduce negative effects on compression due to distortion or discontinuities in the planar representation, mappings for compressing respective unit vectors are adaptively selected.

20 Claims, 15 Drawing Sheets

(56) References Cited

U.S. PATENT DOCUMENTS

| | | | |
|---|---|---|---|
| 11,854,112 B1* | 12/2023 | Mammou | ............... G06T 9/001 |
| 2013/0300740 A1 | 11/2013 | Snyder et al. | |
| 2022/0366610 A1 | 11/2022 | Hur et al. | |

* cited by examiner

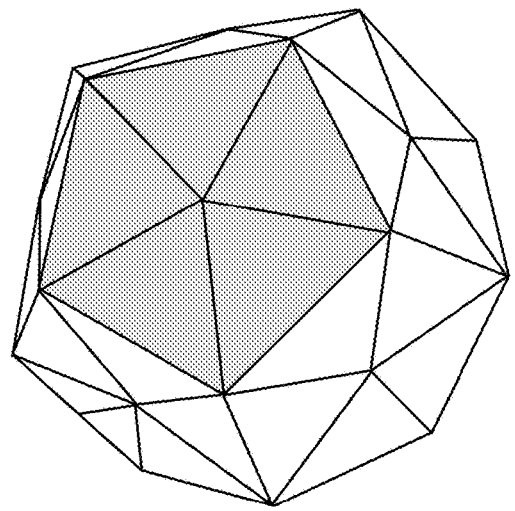 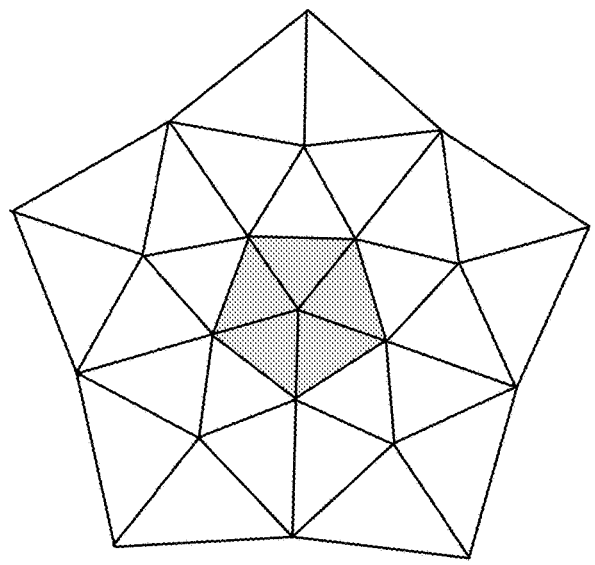
FIG. 8A          FIG. 8B
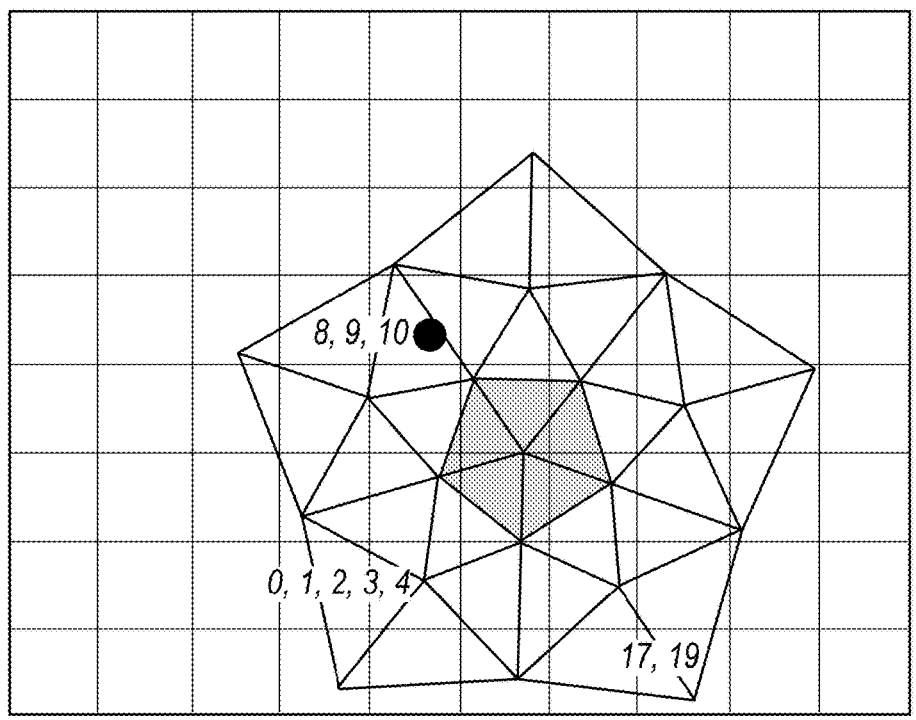
FIG. 8C

COMPRESSION OF ATTRIBUTE VALUES COMPRISING UNIT VECTORS

This application is a continuation of U.S. patent application Ser. No. 17/663,820, filed May 17, 2022, which claims benefit of priority to U.S. Provisional Application Ser. No. 63/197,288, entitled "Compression of Attribute Values Comprising Unit Vectors," filed Jun. 4, 2021, and which are hereby incorporated herein by reference in their entirety.

BACKGROUND

Technical Field

This disclosure relates generally to compression and decompression of attribute information for visual volumetric content, wherein the attribute values comprise unit vectors, such as normal or tangent vectors.

Description of the Related Art

Various types of sensors, such as light detection and ranging (LIDAR) systems, 3-D-cameras, 3-D scanners, etc. may capture data indicating positions of points in three dimensional space, for example positions in the X, Y, and Z planes. Also, such systems may further capture attribute information in addition to spatial information for the respective points, such as color information (e.g. RGB values), texture information, intensity attributes, reflectivity attributes, motion related attributes, modality attributes, or various other attributes. In particular some such attribute information may comprise unitary vectors such as normal vectors or tangent vectors that indicate an orientation of a surface at a location of the point. In some circumstances, additional attributes may be assigned to the respective points, such as a time-stamp when the point was captured. Points captured by such sensors may make up volumetric visual content that is represented using mesh vertices each having associated spatial information and one or more associated attributes, along with mesh connectivity information and/or attribute connectivity information. In some circumstances, visual volumetric content may be generated, for example in software, as opposed to being captured by one or more sensors. In either case, such visual volumetric content may include large amounts of data and may be costly and time-consuming to store and transmit.

Some such visual volumetric content may be represented by a three-dimensional mesh comprising a plurality of polygons (such as triangles) with connected vertices that model a surface of the visual volumetric content. Moreover, texture or attribute values may be overlaid or projected on the mesh to represent the attribute or texture of the points of visual volumetric content when modelled as a three-dimensional mesh. The texture or attribute values may comprise unitary vectors, such as normal or tangent vectors, that indicate respective orientations of the visual volumetric content at the given points. For example, a curved surface may be represented in a three-dimensional mesh representation by an arrangement of flat polygons, such as triangles. In such circumstances, a texture comprising normal vectors may be projected onto the mesh, wherein different locations along a surface of a given polygon are assigned slightly different normal vectors via the texture projection. When rendering the visual volumetric content, the normal vectors may approximate a curved surface overlaid on the flat polygon surface. Thus, reflections, shadows, etc. computed based on the normal vectors may more realistically emulate a curved surface than would be the case if the reflections, shadows, etc. were computed based on the flat surfaces of the polygons of the mesh.

SUMMARY OF EMBODIMENTS

In some embodiments, a system includes one or more sensors configured to capture points representing an object in a view of the sensor and to capture texture or attribute values associated with the points of the object, such as normal vectors or tangent vectors. The system also includes one or more computing devices storing program instructions, that when executed, cause the one or more computing devices to generate a three-dimensional mesh that models the points of the object using vertices and connections between the vertices that define polygons of the three-dimensional mesh, such as mesh triangles. Also, in some embodiments, a three-dimensional mesh may be generated without first being captured by one or more sensors. For example, a computer graphics program may generate a three-dimensional mesh with an associated texture or associated attribute values, such as normal vectors or tangent vectors, to represent an object in visual volumetric content.

In some embodiments, a non-transitory computer-readable medium stores program instructions for generating mesh geometry information and attribute information for visual volumetric content. The mesh information includes vertices information indicating points on a mesh and connectivity information that encodes how vertices are connected to form polygons, such as triangles. The polygons may form a geometric representation of the visual volumetric content, such as a 2D or 3D mesh.

In some embodiments, the non-transitory computer-readable medium stores program instructions for generating attribute information for the visual volumetric content. The attribute information may include texture coordinates, and (optionally) texture connectivity information. The texture coordinates may indicate values for pixel coordinates in a 2D image frame that are to be associated with respective ones of the mesh vertices of the geometric representation. The texture connectivity information may indicate how the texture coordinates are to be connected. For example connections between texture coordinates, such as triangles, in an attribute representation may map to corresponding triangles in the geometric representation. In some embodiments, the texture coordinates and texture connectivity may be used to project or map a texture patch image to a portion of the mesh. The texture patch image may include attribute values to be projected onto polygons (such as triangles) of the mesh. For example, a texture patch image may include normal vectors and/or tangent vectors to be associated with interior points overlaid on a polygon, such as a triangle.

In some embodiments, attribute values, such as unit normal vectors or unit tangent vectors may be entropy encoded (as opposed to signaled in texture patch images) and may be assigned to respective vertices of the mesh. Moreover, a rendering device may interpolate normal vectors or tangent vectors to be associated with interior points of a polygon (such as a triangle) based on signaled attribute values, such as unit vectors (e.g., normal vectors or tangent vectors) associated with vertices of the polygon (e.g., the triangle).

Since unitary vector attributes with three dimensions (e.g., x, y, z) correspond to points located on a three-dimensional unit sphere, the three-dimensional (3D) unit vectors can be represented in two dimensions as coordinates of points on the sphere. Said another way, the unit sphere is a curved manifold of dimension two and the 3D unit vectors are two dimensional attributes in a three dimension Euclidian space. Therefore, instead of representing a unitary vector by its three Cartesian coordinates (x, y, z), it is more efficient to encode its 2D parametric coordinates (s,t) according to a mapping of the sphere on a plane.

However, mapping a sphere to a flat plane results in discontinuities and/or distortion for portions of the planar representation of the sphere. Distortion introduced due to mapping a sphere to a planar representation may include length and/or angle distortions that vary in the planar representation as compared to the sphere. For example, a globe of the earth when mapped to a two dimensional flat plane results in distortion at the poles, e.g. points at the equator and points at the North and South pole are not evenly spaced, but instead distances are distorted such that a same distance at the equator appears to be a smaller distance at the poles. Likewise other mappings may cut the globe when converting it to a planar representation, such that there are discontinuities (e.g. gaps) between points that would otherwise be adjacent in the 3D representation of the globe. Note that the globe is just given as an example to assist in understanding. As described below, various techniques may be used to map a unit sphere to a planar representation.

In some embodiments, in order to reduce effects of discontinuities and/or distortion in a 3D to 2D mapping that may otherwise impact prediction performed in the 2D planar domain, mappings to be used to map points on the unit sphere to the planar representation are adaptively selected. For example, in many mappings between a 3D sphere and a planar representation, discontinuities and distortion are most pronounced at the edges of the planar representation, such as regions removed from an origin point in the planar representation. Thus, by adaptively selecting the mapping, an orientation of the planar representation can be adaptively selected such that a point being mapped from the unit sphere to the planar representation is located in the planar representation near an origin point and away from discontinuous or distorted portions of the unit sphere in the planar representation. Also, instead of using a single fixed mapping for all unit vectors of the volumetric content that are being mapped into the planar representation for compression (e.g., prediction and computation of a residual), different respective unit vectors (e.g., attributes A(i)) can be mapped differently, wherein the mappings are adaptively selected to avoid discontinuities and distortion in the 2D planar representation. Moreover, the selected mappings may be communicated in the bit stream for the compressed unit vectors along with computed residual values for the compressed unit vectors.

Additionally, in some embodiments, the program instructions may adaptively select a prediction technique to be used to predict an attribute value for a mesh vertex, such as parametric coordinates for a unit vector that has been mapped into a planar representation according to an adaptively selected mapping, wherein multiple prediction techniques are available to be selected from. For example, in some embodiments relationships between a triangle in a geometric representation and a corresponding triangle in an attribute representation may be exploited to improve prediction. Also in some embodiments, a prediction technique may be adaptively selected based on a resulting compression efficiency if the given prediction technique is selected and/or an amount of distortion introduced if the given prediction technique is selected. For example, a set of available prediction techniques that are candidates for selection may be determined, for example based on a number of already predicted or signaled attribute values in an attribute representation for a given triangle or set of triangles (e.g. already predicted or signaled parametric coordinates for other unit vectors). Furthermore, a prediction technique to be used may be adaptively selected based on results of a rate distortion optimization (RDO) analysis, or other optimization.

In some embodiments, to compress the attribute information, the program instructions, when executed using one or more processors cause the one or more processors to for respective ones a plurality of vertices of a geometric mesh representation: adaptively select a mapping for mapping a predicted unit vector into 2D parametric coordinates of a planar representation comprising a planar representation of a unit sphere. The mapping is selected such that a point on the unit sphere corresponding to the predicted unit vector is located proximate to an origin point in the planar representation and away from discontinuous or distorted portions of the unit sphere in the planar representation. Additionally, to compress the attribute information, the program instructions, when executed using one or more processors cause the one or more processors to predict 2D parametric coordinates for the unit vector for the mesh vertex based on other signaled or predicted parametric coordinates for other unit vectors neighboring the unit vector in the planar representation of the unit sphere, map, using the selected mapping, an original version of the unit vector included in the received or generated attribute information into 2D parametric coordinates, and determine an attribute correction value for the predicted 2D parametric coordinates for the mesh vertex based on a difference between the predicted 2D parametric coordinates and the 2D parametric coordinates of the original version of the unit vector that has been mapped into the planar representation according to the selected mapping. In some embodiments, the residual values are entropy encoded or may be video encoded as pixels of a 2D attribute image.

In some embodiments, to decompress the attribute information, the program instructions, when executed using one or more processors cause the one or more processors to, for respective ones a plurality of vertices of a geometric mesh representation: adaptively select a mapping for mapping a predicted unit vector into 2D parametric coordinates of a planar representation comprising a planar representation of a unit sphere, predict 2D parametric coordinates for the unit vector for the mesh vertex based on other signaled or predicted parametric coordinates for other unit vectors neighboring the unit vector to be predicted in the planar representation of the unit sphere, apply an attribute correction value for the predicted 2D parametric coordinates for the mesh vertex to generate decompressed 2D parametric coordinates for the mesh vertex, and map the decompressed 2D parametric coordinates into 3D space using the selected mapping to generate a decompressed version of the unit vector for the mesh vertex. In some embodiments, the program instructions further cause the processors to normalize the reconstructed unit vectors, for example to account for any differences between the actual unit vector length and the recreated unit vector length introduced due to the mapping.

In some embodiments, the program instructions cause the one or more processors to video encode (or video decode) image frames comprising patch images (for example as may be referenced via texture coordinates that are compressed and decompressed as attribute values). As discussed above, in some embodiments the computed residual values for predicted planar coordinates may be encoded as pixel values of a 2D image frame. In some embodiments, the program instructions may utilize a video encoder or decoder in accordance with the High Efficiency Video Coding (HEVC) standard or other suitable standards such as, the Advanced Video Coding (AVC) standard, the AOMedia Video 1 (AV1) video coding format, etc. In some embodiments, the encoder or decoder may utilize an image encoder or decoder in accordance with a Motion Picture Experts Group (MPEG) or a Joint Photography Experts Group (JPEG) standard, etc.

BRIEF DESCRIPTION OF THE DRAWINGS

FIGS. 8A-8C illustrate a three dimensional dodecahedron and a cut and unfolded two-dimensional version of the dodecahedron, wherein a dodecahedron may be used for selectively mapping between a unit sphere and a planar representation, according to some embodiments.

Figure 1A:
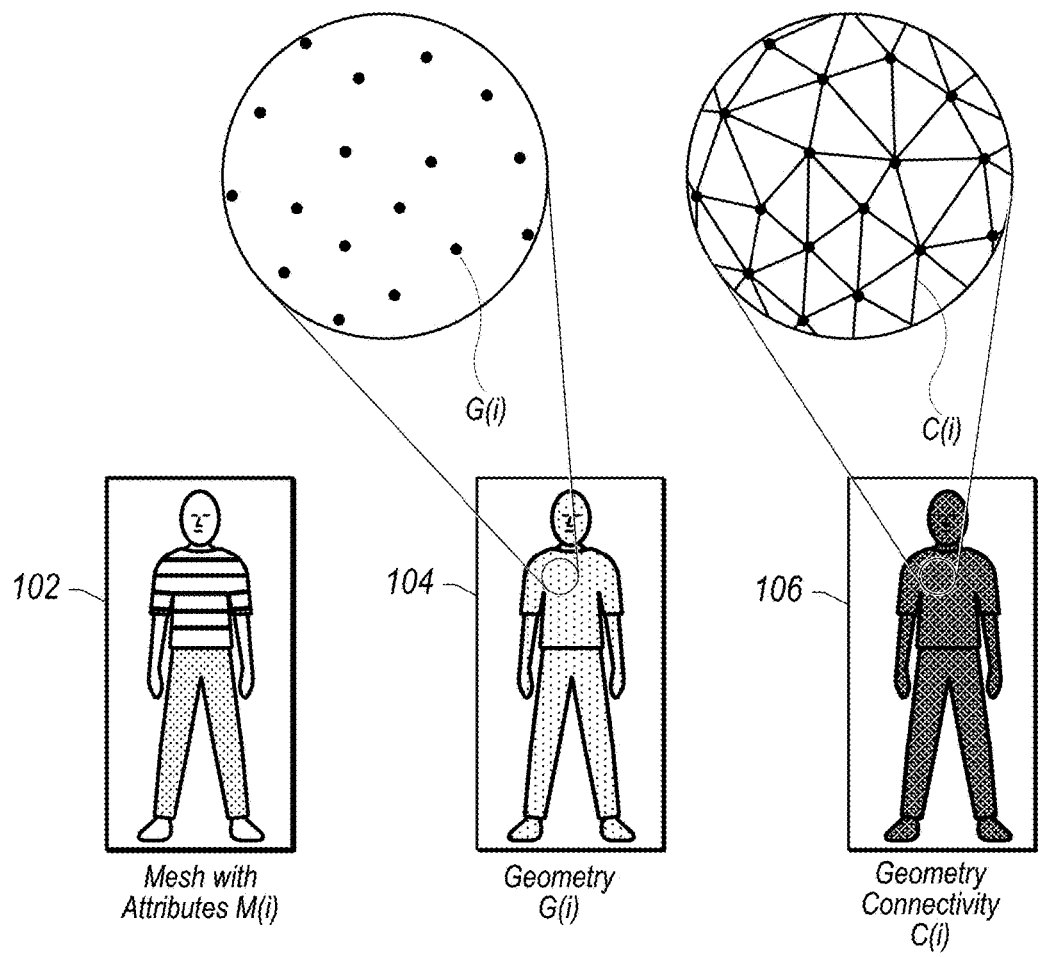
FIG. 1A illustrates visual volumetric content including geometry and connectivity information of a geometrical representation and attribute values and attribute connectivity of an attribute representation, according to some embodiments.
Figure 1A:
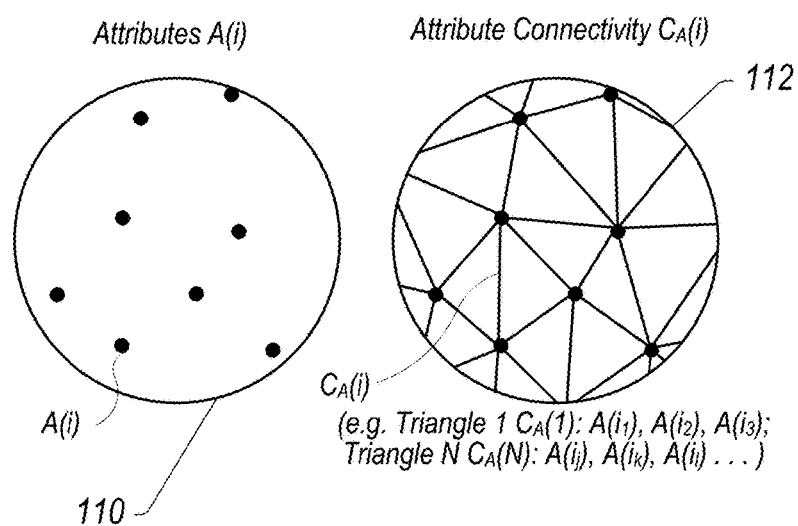

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . " Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112(f), for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

DETAILED DESCRIPTION

As data acquisition and display technologies have become more advanced, the ability to capture visual volumetric content comprising thousands or millions of points in 2-D or 3-D space, such as via LIDAR systems, has increased. Large visual volumetric content files may be costly and time-consuming to store and transmit. For example, communication of visual volumetric content over the Internet requires time and network resources, resulting in latency.

In some embodiments, an encoder generates compressed visual volumetric content to reduce costs and time associated with storing and transmitting visual volumetric content. In some embodiments, a system may include an encoder that compresses attribute and/or spatial information of a visual volumetric content file such that the visual volumetric content file may be stored and transmitted more quickly than non-compressed visual volumetric content and in a manner that the visual volumetric content file may occupy less storage space than non-compressed visual volumetric content. In some embodiments, compression of attributes for vertices in visual volumetric content may enable the visual volumetric content to be communicated over a network in real-time or in near real-time. For example, a system may include a sensor that captures attribute information about points in an environment where the sensor is located, wherein the captured points and corresponding attributes make up visual volumetric content. The system may also include an encoder that compresses the captured visual volumetric content attribute information. The compressed attribute information of the visual volumetric content may be sent over a network in real-time or near real-time to a decoder that decompresses the compressed attribute information of the visual volumetric content. The decompressed visual volumetric content may be further processed, for example to make a control decision based on the surrounding environment at the location of the sensor. The control decision may then be communicated back to a device at or near the location of the sensor, wherein the device receiving the control decision implements the control decision in real-time or near real-time. In some embodiments, the decoder may be associated with an augmented reality system and the decompressed attribute information may be displayed or otherwise used by the augmented reality system. In some embodiments, compressed attribute information for a visual volumetric content may be sent with compressed spatial information for the visual volumetric content, such as an encoded mesh. In other embodiments, spatial information and attribute information may be separately encoded and/or separately transmitted to a decoder.

In some embodiments, a system may include a decoder that receives one or more sets of visual volumetric content data comprising compressed attribute information via a network from a remote server or other storage device that stores the one or more visual volumetric content files. For example, a 3-D display, a holographic display, or a head-mounted display may be manipulated in real-time or near real-time to show different portions of a virtual world represented by visual volumetric content. In order to update the 3-D display, the holographic display, or the head-mounted display, a system associated with the decoder may request visual volumetric content data from the remote server based on user manipulations of the displays, and the visual volumetric content data may be transmitted from the remote server to the decoder and decoded by the decoder in real-time or near real-time. The displays may then be updated with updated visual volumetric content data responsive to the user manipulations, such as updated point attributes.

In some embodiments, a system, may include one or more LIDAR systems, 3-D cameras, 3-D scanners, etc., and such sensor devices may capture spatial information, such as X, Y, and Z coordinates for points in a view of the sensor devices. In some embodiments, the spatial information may be relative to a local coordinate system or may be relative to a global coordinate system (for example, a Cartesian coordinate system may have a fixed reference point, such as a fixed point on the earth, or may have a non-fixed local reference point, such as a sensor location).

In some embodiments, such sensors may also capture attribute information for one or more points, such as color attributes, texture attributes, reflectivity attributes, velocity attributes, acceleration attributes, time attributes, modalities, and/or various other attributes. In some embodiments, other sensors, in addition to LIDAR systems, 3-D cameras, 3-D scanners, etc., may capture attribute information to be included in visual volumetric content. For example, in some embodiments, a gyroscope or accelerometer, may capture motion information to be included in visual volumetric content as an attribute associated with one or more mesh vertices of the visual volumetric content. For example, a vehicle equipped with a LIDAR system, a 3-D camera, or a 3-D scanner may include the vehicle's direction and speed in visual volumetric content captured by the LIDAR system, the 3-D camera, or the 3-D scanner. For example, when points in a view of the vehicle are captured they may be included in visual volumetric content, wherein the visual volumetric content includes mesh information representing the captured points and associated motion information corresponding to a state of the vehicle when the points were captured. In some embodiments, the motion information may be represented by unitary vectors, for example indicating a direction of motion of an object. Also, in some embodiments, the attribute information may include unit vectors for stationary objects such as normal vectors or tangent vectors.

Attribute information such as texture coordinates, normal vectors, tangent vectors, color information (e.g., RGB values, YCbCr values, etc.) are associated with mesh vertices and may represent a significant part of the overall mesh information for volumetric visual content. Thus, compressing an amount of information needed to be signaled to communicate the attribute information improves overall compression efficiency of visual volumetric content.

In some embodiments, unitary vectors included in attribute information, such as vectors with a "unit length" such that the vectors correspond to points on a unit sphere may be compressed by representing the unitary vectors using two coordinates, such as coordinates of the point on the unit sphere when the unit sphere is mapped into a two dimensional planar representation, as opposed to signaling three coordinates (e.g. x, y, z) (or residual values for three coordinates, e.g. residual values for x, y, z) for each unit vector.

FIG. 1A illustrates visual volumetric content including geometry and connectivity information of a geometrical representation and attribute values and attribute connectivity of an attribute representation, according to some embodiments.

For example, in some embodiments, visual volumetric content 102 includes a mesh with texture, which is communicated as geometry information 104, connectivity information 106, attribute values 110, and attribute connectivity 112. The geometry information and connectivity information may collectively define a mesh geometry for the volumetric visual content (e.g. a geometric representation). For example, the geometry information 104 includes vertex coordinates G(i) for vertices of a mesh and the connectivity information 106 includes information indicating connections C(i) for connecting the mesh vertices G(i) via one or more edges to form polygons, such as triangles. The polygons (e.g. triangles) collectively form a surface of the mesh.

In some embodiments, the attribute values 110 include attribute values to be associated with the respective vertices G(i) of the mesh. In some embodiments, there may not be a one-to-one ratio between attribute values A(i) and vertices G(i). For example, some vertices may be assigned more than one attribute value A(i) or some vertices may not be assigned an attribute value A(i). However, in some embodiments, there may be a one-to-one ratio between the attribute values A(i) and the vertices G(i), wherein each vertex is assigned an attribute value A(i). In some embodiments, the attributes may use a same connectivity as the mesh, such as connectivity information 106, or in some embodiments a separate attribute connectivity 112 may be used. For example, attribute connectivity information 112 may include information indicating connections ($A_c$(i), such as sets of attribute values A(i) that form vertices of a triangle in the attribute information (e.g., triangles defined via attribute values 110 and attribute connectivity 112). For example, the attribute values 110 may be associated with vertices of the mesh (e.g., vertices G(i)), but in the attribute information representation, the connectivity may be different, such as forming larger or smaller triangles.

In some embodiments, the attribute values A(i) comprise texture coordinates indicating coordinates for pixels of a 2D texture image that comprises attribute values to be associated with the respective vertices of the mesh. For example, a given texture coordinate TC(i) (wherein the attribute values A(i) are texture coordinates TC(i)), may indicate a position such as (u,v) of a pixel in a 2D texture image. Wherein the information stored in a pixel located at position (u,v) is to be associated with a mesh vertex G(i) that corresponds to the texture coordinate TC(i). In some embodiments, residual values for predicted unitary vectors in a planar (e.g. 2D domain) may be signaled as entropy encoded attribute values or may be signaled as video encoded pixels of a 2D texture image.

Figure 1B:
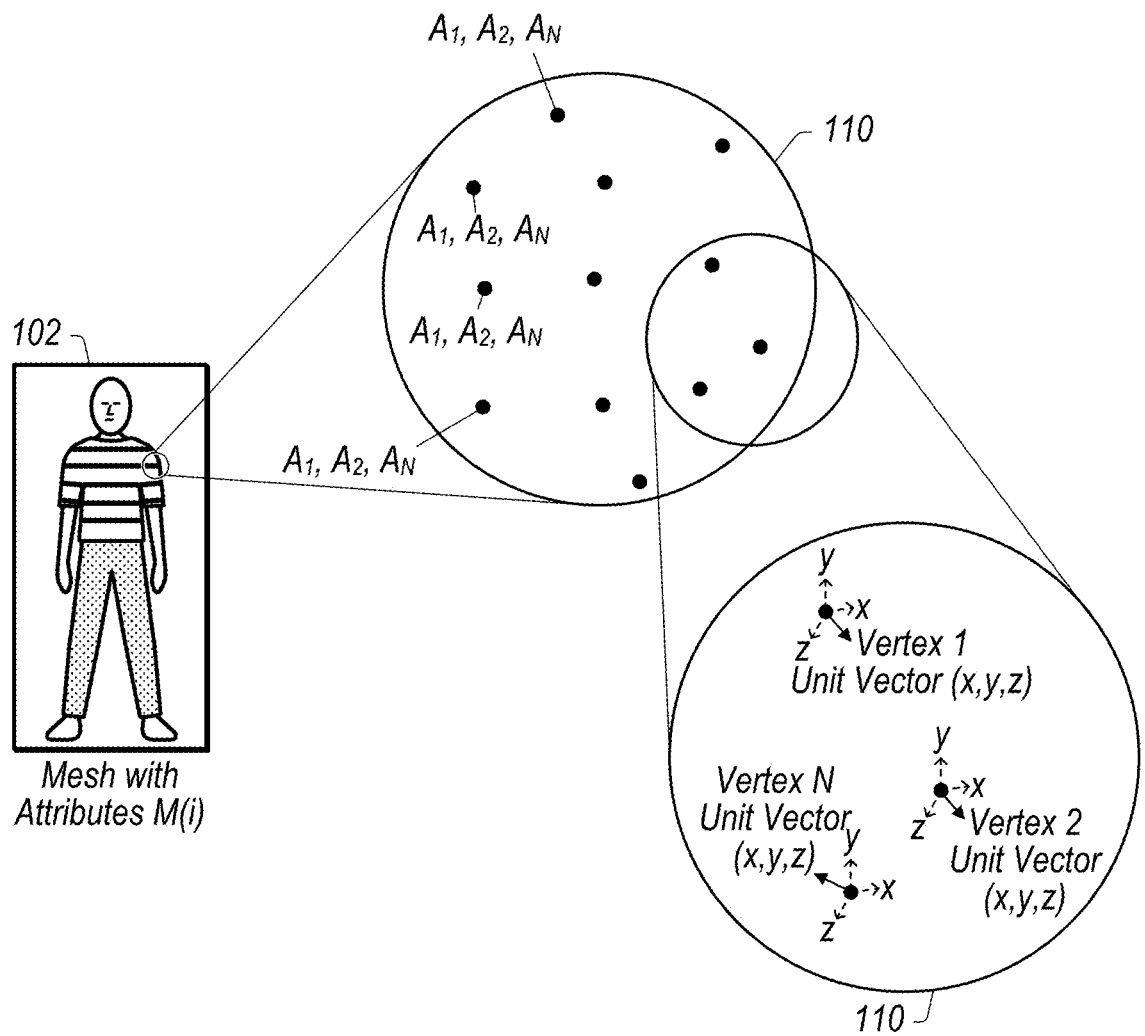
FIG. 1B illustrates a more detailed view of the attribute representation, wherein the attribute values include unit vectors, such as normal or tangent vectors associated with the vertices of the mesh, according to some embodiments.

FIG. 1B illustrates a more detailed view of the attribute representation, wherein the attribute values include unit vectors, such as normal or tangent vectors associated with the vertices of the mesh, according to some embodiments.

For example, each vertex having associated attribute values A(i), may be associated with up to N dimensional values, such as x, y, and z components of a unitary vector (e.g. $A_1, A_2 \ldots A_N$). While several of the examples described herein focus on unitary vector attributes of dimension 3 (e.g., $\|A_v\|_2=1$) such as normal and tangent vectors, adaptively selecting a mapping as described herein could be generalized to vectors of higher dimensions.

Figure 2:
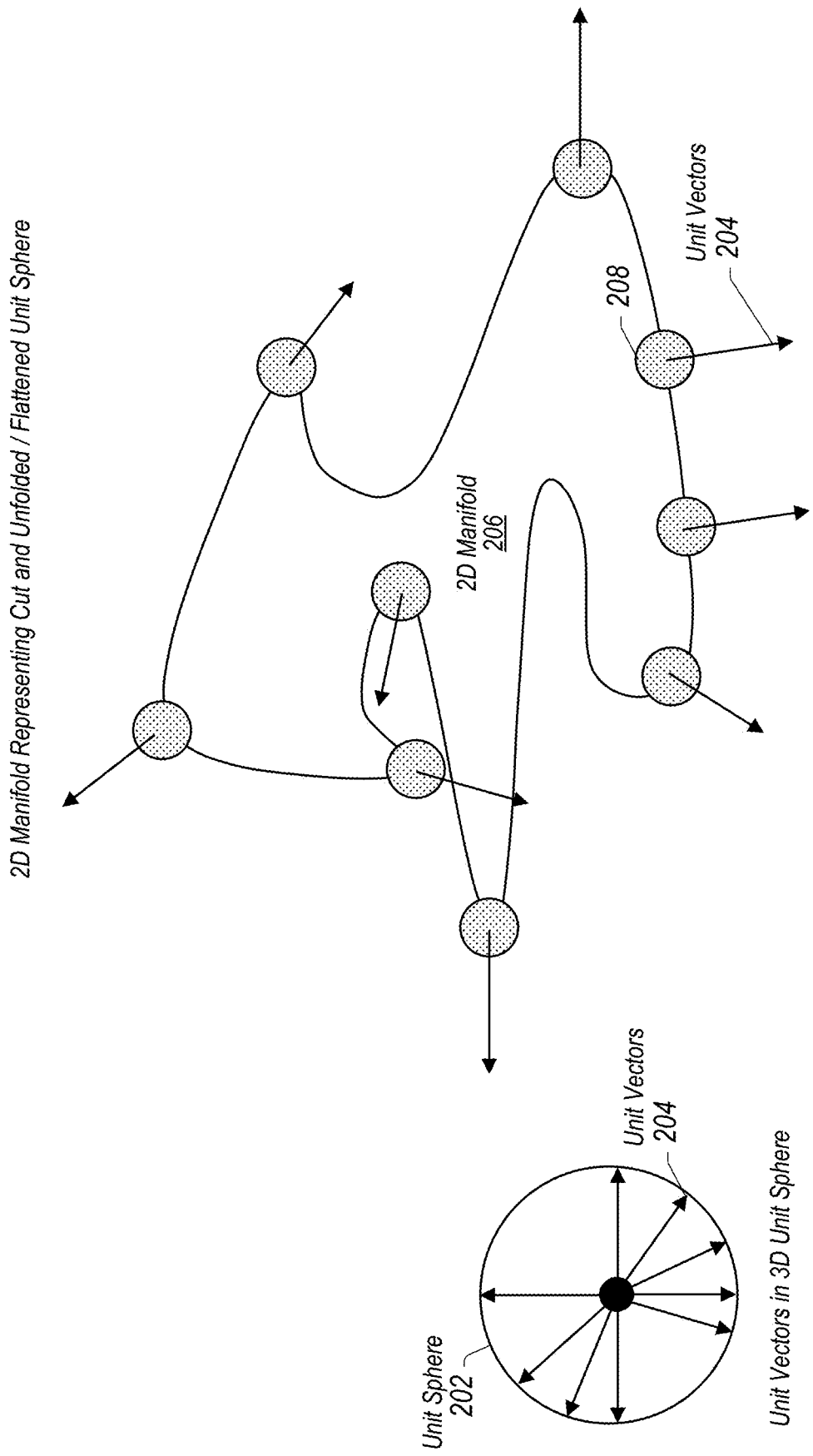
FIG. 2 illustrates a three-dimensional unit sphere and a corresponding curved manifold, wherein unit vectors associated with the unit sphere are represented using two dimensional parametric coordinates in a planar representation (e.g. such as the curved manifold), according to some embodiments.

As shown in FIG. 1B, in some embodiments, respective ones of the mesh vertices have associated unit vectors represented by three coordinates (e.g. (x, y, z)) in 3D space that can be mapped using an adaptively selected mapping into parametric coordinates (e.g. (s,t)) of a planar representation of a unit sphere, such as shown in FIG. 2.

FIG. 2 illustrates a three-dimensional unit sphere and a corresponding curved manifold, wherein unit vectors associated with the unit sphere are represented using two dimensional parametric coordinates in a planar representation (e.g. such as the curved manifold), according to some embodiments.

For example, unit vectors 204 may be represented using three-dimensional coordinates (x, y, z) in a three-dimensional domain such as in unit sphere 202. However, the ends of the vectors 204 intersect unit sphere 202 at a point. Moreover, unit sphere 202 can be represented as a curved 2D manifold 206, in which case the points 208 on the 2D manifold 206, which correspond to the unit vectors 204, may be represented in two dimensions, such as via parametric coordinates (s,t).

In some embodiments, various shapes may be used to approximate a unit sphere and points on the unit sphere may be projected onto a selected shape, selected to approximate the unit sphere. As described below in further detail, in some embodiments an encoder and/or a decoder may support projection onto different shapes, and a given shape to be used for mapping a point on a unit sphere to a planar representation may be adaptively selected. For example, some shapes may include more faces which add complexity, but may have faces that more closely approximate the unit sphere, thus reducing distortion. Also, some shapes may be more amenable to being cut such that less discontinuities are added as compared to cutting other shapes. In some embodiments, an adaptive mapping selection module may consider such parameters when selecting a shape to use for mapping a point on a unit sphere into a planar representation.

In some embodiments, various orientations for a selected shape may be selected from when mapping a point on a unit sphere to a planar representation. For example, a point located near an origin of a shape may be mapped to a region comprising an origin of a planar representation of the shape with few or no discontinuities and/or low distortion. However, if a different orientation is selected for the shape during the mapping, the same point on the unit sphere may be mapped to a region of a planar representation away from the origin and proximate to discontinuities or wherein distances, etc. are distorted. Thus, adaptively selecting a shape and/or orientation of the shape when performing a mapping may reduce prediction errors (e.g. that drive high residuals) by selecting a region in the planar representation to map a point on the unit sphere to that is removed from discontinuities and in a region with minimal distortion. Moreover, instead of selecting a single mapping which may map some points on the unit sphere to regions of a planar representation with few discontinuities and low distortion, but may map other points on the unit sphere, such as points on an opposing side of the unit sphere, to regions adjacent to discontinuities or where there is considerable distortion, an adaptively selected mapping may vary the shape choice and/or shape orientation used for the mapping so that all or almost all points on the unit sphere are mapped to regions of the planar representation removed from discontinuities and with low distortion.

In some embodiments, various parameterizations and/or mappings of the unit sphere onto a single or multiple regions of a plane are available, such as spherical angles, cube map projection, equiangular projection, equirectangular projection, stereographic projection, conformal, harmonic mean, equidistant maps, etc. Note that distortion as described herein comprises local changes in area, length, and angles due to the curved nature of the sphere being mapped to a flat face of a shape approximating the sphere. Also, as described herein, discontinuities comprise cuts or seams introduced in a planar representation due to differences in topology between the unit sphere and the planar representation. For example, a plane is an open surface while the sphere is a closed one.

In some embodiments a selected mapping for mapping a given point on a unit sphere corresponding to a unit vector for a given mesh vertex of the visual volumetric content is selected such that distortion, continuity, and computational complexity of the mapping are optimized. For example, more complex shapes may provide lower distortion, but may introduce more discontinuities, for example there may be more cuts for a shape with more faces as opposed to a shape with fewer faces. Though a shape with more faces may more closely approximate a surface of the unit sphere, thus reducing distortion. Also, more complex shapes may require more computational resources when used for a mapping. In some embodiments, shape selection may further be varied based on available computational resources.

In some embodiments, adaptively selected mapping as described herein may be used to implement efficient processing of other signals defined on a sphere, such as filtering and compression of omnidirectional videos.

Figure 3:
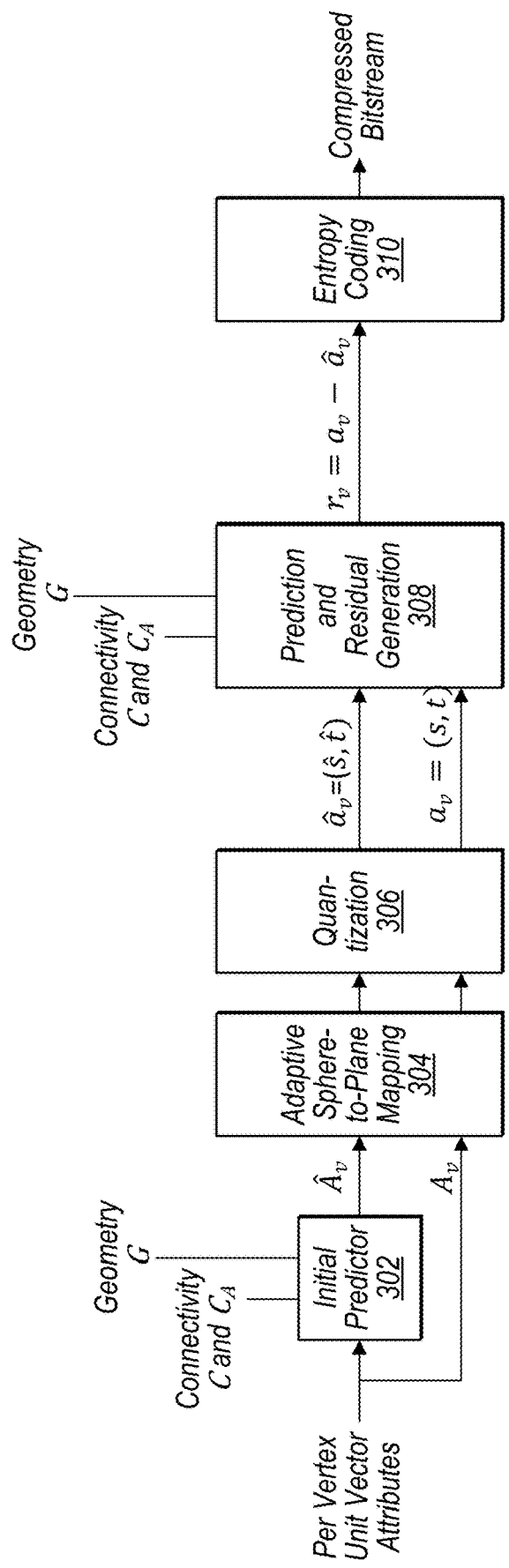
FIG. 3 is a block diagram illustrating components of a compression pipeline that includes adaptively selected mapping for mapping unit vectors between a three-dimensional representation and a planar representation, according to some embodiments.

FIG. 3 is a block diagram illustrating components of a compression pipeline that includes adaptively selected mapping for mapping unit vectors between a three-dimensional representation and a planar representation, according to some embodiments.

In some embodiments, an initial prediction module 302 receives geometry information for visual volumetric content, such as mesh vertices G(i) and connectivity C(i), such as discussed in FIG. 1A. The initial prediction module 302 also receives attribute connectivity information C A (i) (if different than the geometry connectivity information) and per vertex unit vector attribute A(i), such as the unit vectors shown in FIG. 1B. Based on the received geometry information and based on previously predicted attribute values and/or signaled starting attribute values, the initial prediction module 302 predicts an attribute value for a given vertex being evaluated, such as a unit vector. Note that prediction is used as opposed to the actual unit vector received in the attribute information in order to approximate the unit vector that will be predicted at the decoder (which does not have access to the uncompressed attribute information). In some embodiments, initial prediction module 302 and/or prediction and residual generation module 308 further adaptively select a prediction technique from a plurality of supported prediction techniques, such as an orthogonal projection technique with signaled orthogonal projection direction sign, an orthogonal projection technique without signaled orthogonal projection direction sign, a parallelogram prediction technique, a linear prediction technique, an average prediction technique, and/or a delta prediction technique.

Based on the results of the prediction performed by initial prediction module 302, an adaptive sphere to plane mapping module 304 selects a mapping to be used to map a point on the unit sphere to the unit vector for the vertex being evaluated into 2D parametric coordinates. For example, a shape and/or orientation of the shape for the mapping is selected such that the point on the unit sphere is mapped to a region in the planar representation of the selected shape having the selected orientation that is near an origin point for the shape using the selected orientation and away from discontinuous or distorted portions of the unit sphere in the planar representation. Also, adaptive sphere to plane mapping module 304 maps the predicted point on the unit sphere ($\hat{A}_v$) to a parametric representation ($\hat{\alpha}_v=(\hat{s}, \hat{t})$ and also maps the original unit vector (non-compressed) ($A_v$) to a parametric representation ($\alpha_v=(s, t)$).

The prediction and residual generation module 308 optionally performs a prediction in a 2D domain using previously predicted or signaled parametric coordinates for the planar representation or uses the re-mapped 3D prediction generated by initial prediction module 302 that has been mapped to 2D parametric coordinates via adaptive sphere to plane mapping module 304. The prediction and residual generation module 308 then determine an attribute correction value (e.g. residual difference) between the predicted parametric coordinates for the unit vector for the given vertex (either predicted in the 2D domain or predicted in the 3D domain and mapped to the 2D domain) and the original unit vector for the vertex included in the received or generated attribute information that has been mapped into parametric coordinates via adaptive sphere to plane mapping module 304. The residual values are then entropy encoded via entropy encoding module 310. In some embodiments, the residual values may be video encoded as a pixels of a texture image frame for the visual volumetric content.

Figure 4:
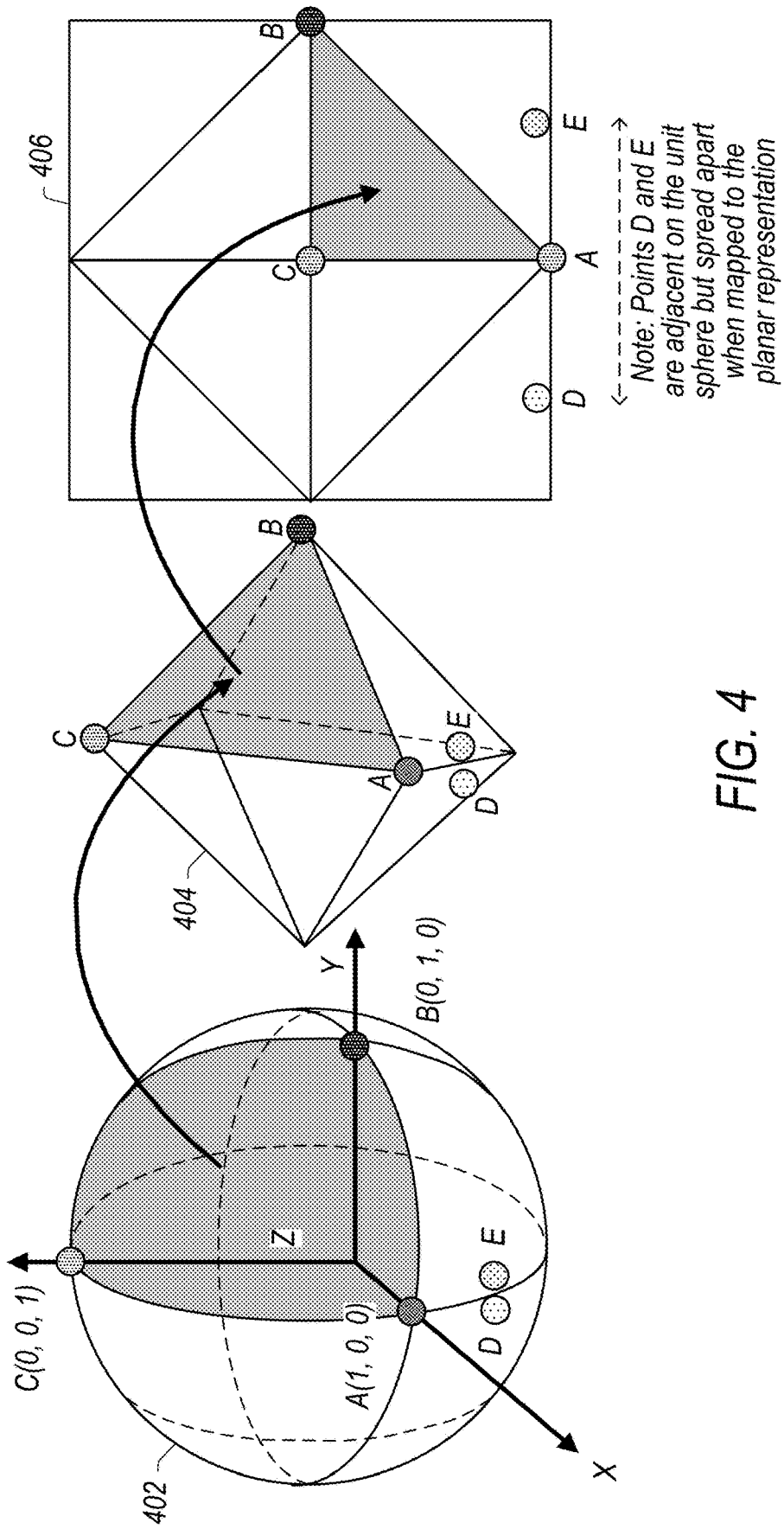
FIG. 4 illustrates another example mapping, wherein points on a unit sphere are mapped to points on an octahedron, wherein the octahedron is cut and unfolded into a planar representation, according to some embodiments.

FIG. 4 illustrates another example mapping, wherein points on a unit sphere are mapped to points on an octahedron, wherein the octahedron is cut and unfolded into a planar representation, according to some embodiments.

In some embodiments, one such shape that may be selected for mapping between a unit sphere and a planar representation is an octahedron, such as octahedron 404.

As can be seen in FIG. 4, the upper half of the unit sphere can be divided into four quadrants and the lower half of the unit sphere 402 can be divided into four quadrants resulting in eight sections total. Also, as can be seen, an octahedron has eight faces/sides. Thus, each of the sections of the unit sphere 402 can be projected onto a corresponding face of octahedron 404. Furthermore, the octahedron 404 can be cut and unfolded into a planar representation 406. As shown in FIG. 4 the dark shaded upper half quadrant of unit sphere 402 is projected onto the dark shaded face of the octahedron 404, which is then unfolded and shown as the dark shaded triangle in the unfolded planar representation 406.

Also as can be seen in FIG. 4 the selection of the orientation of the octahedron relative to the unit sphere changes where points are projected onto the octahedron. For example, point C on the unit sphere is projected to the top of the octahedron where the top half quadrants meet. Also, as can be seen in FIG. 4, the way in which the octahedron is cut and folded out from the bottom results in point C being at the center (e.g. origin) of the unfolded planar representation 406. Such a placement at the origin is away from discontinuities and distortion. For example, a neighboring point located near point C would be mapped adjacent to point C in the unfolded planar representation 406.

In contrast, points D and E are away from the point C on the unit sphere, such that they are mapped onto bottom half adjoining faces of the octahedron 404. Additionally, when the octahedron 404 is unfolded into the unfolded planar representation 406 points D and E are spread apart, thus introducing distortion. Note that points D and E are adjacent on the unit sphere 402 but widely separated in the unfolded representation 406.

Thus in some embodiments, different orientations of the unit sphere relative to the octahedron may be adaptively selected for point D and E, that are different than an orientation used for projecting point C onto the octahedron. For example, the octahedron may be oriented "up-side down" in the unit sphere as compared to what is shown in FIG. 4 such that points D and E are mapped to locations adjacent to where point C is currently shown in the unfolded planar representation 406.

In some embodiments, an adaptive sphere to plane mapping module 304 selects from six possible unit sphere to octahedron mappings. For example, the octahedron may be oriented such that the top point that unfolds to be at the center of the unfolded planar representation is aligned with the positive X-axis, negative X-axis, positive Y-axis, negative Y-axis, positive Z-axis, or the negative Z-axis.

Said another way, the octahedron mapping described in FIG. 4 maps the point C(0, 0, 1) to the origin (0,0) of the 2D plane. Here, the main orientation of the octahedron mapping is (0, 0, 1). Notice that the regions around point C are projected without discontinuities. However, regions far away from C such as the region around points D and E suffer from discontinuities leading to poor prediction in the 2D domain. If, instead of choosing the main orientation of the octahedron mapping as (0, 0, 1), (0, 0, −1) was chosen, the obtained mapping would map point C'(0, 0, −1) to the origin (0,0) and points D and E would be mapped to a region without discontinuities, thus allowing a more efficient prediction. In other words the mapping could be selected such that the orientation of the unit sphere relative to the octahedron was 180 degrees different in the vertical direction.

In some embodiments, six predictions could be derived depending on the main orientation of the octahedron, such as:

(0, 0, 1)
(0, 0, −1)
(0, 1, 0)
(0, −1, 0)
(1, 0, 0)
(−1, 0, 0)

In some embodiments, the main octahedron orientation used for mapping is selected based on a preliminarily predicted unit vector, such as is predicted via initial prediction module 302 in FIG. 3 (e.g., $\hat{A}_v$). Let $(\hat{x}_v, \hat{y}_v, \hat{z}_v)$ be the three components of $\hat{A}_v$. The selection of the main octahedron mapping orientation is selected as follows:

$$\begin{cases} (1, 0, 0) \text{ if } \hat{x}_v > |\hat{y}_v| \text{ and } \hat{x}_v > |\hat{z}_v| \\ (-1, 0, 0) \text{ if } -\hat{x}_v > |\hat{y}_v| \text{ and } -\hat{x}_v > |\hat{z}_v| \\ (0, 1, 0) \text{ if } \hat{y}_v > |\hat{x}_v| \text{ and } \hat{y}_v > |\hat{z}_v| \\ (0, -1, 0) \text{ if } -\hat{y}_v > |\hat{x}_v| \text{ and } -\hat{y}_v > |\hat{z}_v| \\ (0, 0, 1) \text{ if } \hat{z}_v > |\hat{x}_v| \text{ and } \hat{z}_v > |\hat{y}_v| \\ (0, 0, -1) \text{ if } -\hat{z}_v > |\hat{x}_v| \text{ and } -\hat{z}_v > |\hat{y}_v| \end{cases}$$

Notice that the proposed adaptive mapping shown above makes sure that the predicted vector $\hat{A}_v$ is mapped close to the origin (0,0) and far away from the discontinuities. Since $A_v$ has a high probability to be close to $\hat{A}_v$, the prediction in the 2D domain has a high probability to avoid the discontinuities around the 2D square boundaries, leading to better compression.

More generally, a mapping is chosen based on the predicted vector $\hat{A}_v$ in order to increase the probability of mapping the attribute vector $\hat{A}_v$ to a low distortion area with a low amount of discontinuities. The choice could be fixed as described above, or learned dynamically during the compression process by learning from previously encoded vertices or frames. It could be implicit or explicitly specified in the bitstream. It could rely on the same family of mappings (e.g., the 6 octahedron mappings) or could mix various mappings to achieve the best compromise between rate distortion performance and encoder/decoder complexity.

Figure 5A:
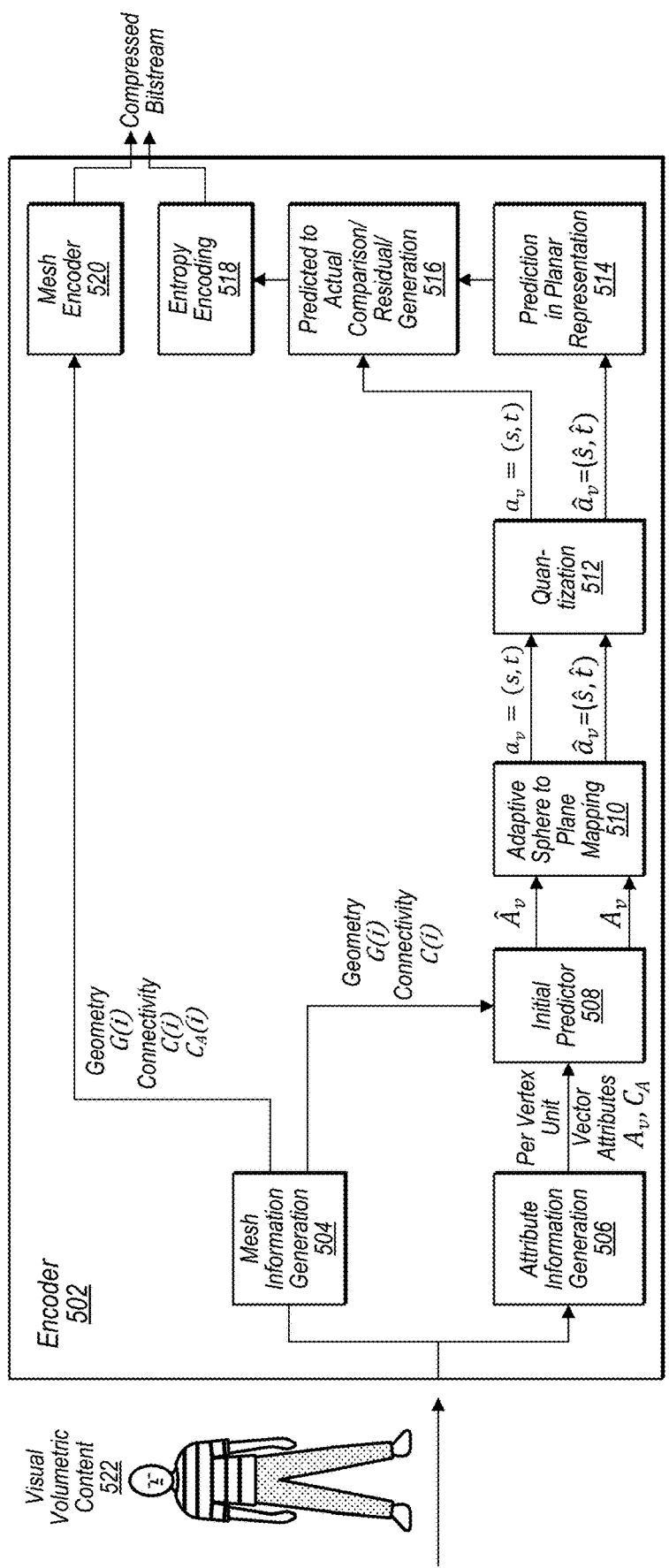
FIG. 5A illustrates an example encoder for compressing and/or encoding visual volumetric content using adaptively selected mapping, according to some embodiments.

FIG. 5A illustrates an example encoder for compressing and/or encoding visual volumetric content using adaptively selected mapping, according to some embodiments.

In some embodiments, an encoder that utilizes adaptively selected mapping, such as encoder 502, receives visual volumetric content 522. The visual volumetric content may have been captured by sensors, such as LIDAR sensors, cameras capturing a scene from multiple points of view, 3D scanners, etc., or the visual volumetric content may have been computer generated. The visual volumetric content 522 may be converted into mesh information via mesh information generation module 504 and converted into attribute information via attribute information generation and/or texture coordinate generation module 506.

The mesh information may include mesh vertices (e.g., geometry information G(i), which may be similar to geometry information 104 described in FIG. 1A) and connectivity information (e.g., C(i), which may be similar to connectivity information 106 described in FIG. 1A). In some embodiments, the geometry information and the connectivity information may be quantized via a quantization module (not shown), which results in quantized geometry information G'(i) and quantized connectivity information C'(i). As an example, the quantized geometry information and the quantized connectivity information may be represented as fixed point integer values, whereas the non-quantized geometry information and the non-quantized connectivity information may be represented as floating point values.

The attribute information may also optionally include attribute connectivity $A_c(i)$, such as attribute connectivity 112 illustrated in FIG. 1A. The attribute values A(i) may be unit vectors, such as normal vectors or tangent vectors, for example as shown in FIG. 1B.

In some embodiments, one or more of the attribute values and/or quantized connectivities may be explicitly signaled in the bit stream as one or more starting values for prediction.

The per vertex attribute values (e.g. unit vectors) are predicted by initial predictor 508 (e.g. $\hat{A}_v$). This value is then used by adaptive sphere to plane mapping module 510 to adaptively select a mapping. For example, in the context of the octahedron discussed in FIG. 4, if the predicted unit vector $\hat{A}_v$ is oriented towards points D and E, an orientation where the origin point of the unfolded planar representation 406 of the octahedron aligns with the negative Z axis may be selected. In contrast if the predicted unit vector $\hat{A}_v$ is oriented towards point C on the unit sphere 402, an orientation wherein the origin point of the unfolded planar representation 406 is aligned with the positive Z axis may be selected. As yet another example, if the predicted unit vector $\hat{A}_v$ is oriented towards point B an orientation wherein the origin point of the unfolded planar representation 406 that is aligned with the positive Y axis may be selected. As yet another example, if the predicted unit vector $\hat{A}_v$ is oriented towards point A on the unit sphere 402, the orientation wherein the origin point of the unfolded planar representation 406 is aligned with the positive X axis may be selected.

Also, adaptive sphere to plane mapping module 510 may furthermore select from more advanced mapping choices as further described for a sub-divided octahedron or a dodecahedron as described in FIGS. 7-8. Also, in some embodiments, adaptive sphere to plane mapping may adaptive select between different shapes to use for the mapping and/or different techniques for cutting and unfolding a selected shape, as well as an orientation of the selected shape.

The re-mapped parametric coordinates in the planar representation may further be quantized via quantization module 512, for example into fixed point integer values. Prediction in planar representation module 514 may further predict parametric coordinates for an attribute value (e.g. unit vector) in the selected mapping using other parametric coordinates for other attribute values (e.g. unit vectors) previously mapped to the selected portion of the planar representation. The result of the prediction is provided to predicted to actual comparison/residual generation module 516.

Predicted to actual comparison module (e.g. residual value generation module) 516 compares the predicted attribute values $\hat{\alpha}_v$ and the actual attribute values $\alpha_v$ mapped into the planar representation using the adaptively selected mapping. The resulting residual values r(i) are provided to entropy encoder 518 which entropy encodes the residual values r(i) and any explicitly signaled starting values. The mesh geometry information is also encoded via mesh encoder 520, and the combined bit stream includes the encoded mesh information from mesh encoder 520 and the encoded entropy values from entropy encoder 518. In some embodiments, the residual values may be encoded as one or more video encoded 2D texture images instead of, or in addition to, being entropy encoded. In some embodiments, the mesh encoded information and the entropy encoded information may be signaled together or separately, for example in a common bit stream or in separate bit streams.

Furthermore, in some embodiments, respective adaptively selected mappings and/or prediction techniques selected to predict the attribute values A(i) may be included in the entropy encoded bit stream as associated values with the respective residual values. For example, in some embodiments, an encoder and a decoder may use a same indexing scheme to identify mapping or prediction techniques and a two-bit or three-bit value may be signaled to indicate a mapping or prediction technique to use to map and predict a given attribute value. Though, in some embodiments, an encoder and a decoder may utilize similar adaptive mapping selection and/or adaptive prediction scheme selection processes, such that a decoder can implicitly determine a mapping and/or prediction technique to use based on context without an encoder explicitly signaling the mapping or prediction technique in the bit stream.

Figure 5B:
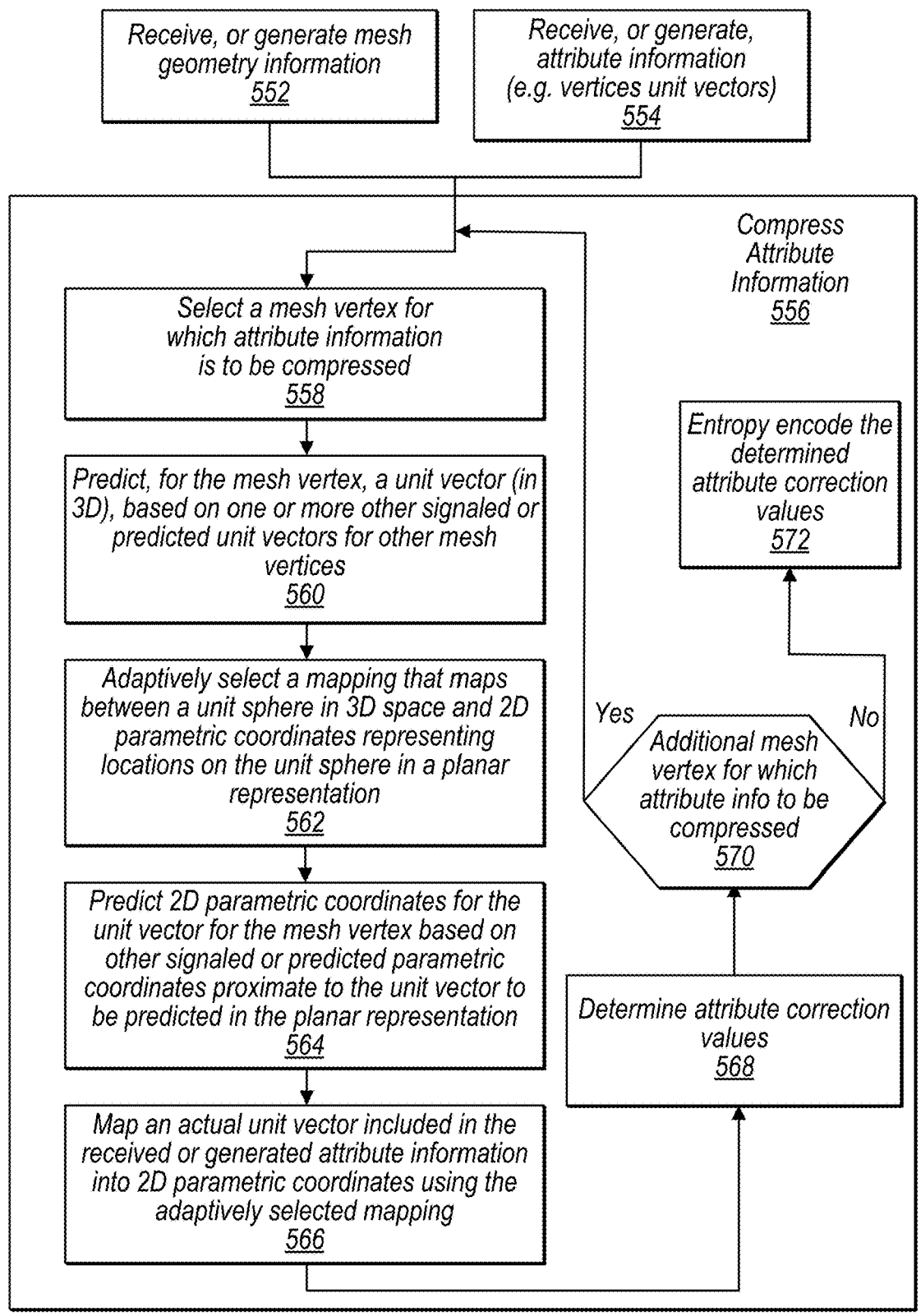
FIG. 5B illustrates an example process for compressing and/or encoding visual volumetric content using adaptively selected mapping, according to some embodiments.

FIG. 5B illustrates an example process for compressing and/or encoding visual volumetric content using adaptively selected mapping, according to some embodiments.

At block 552 an encoder receives or generates mesh geometry information and at 554 the encoder receives or generates attribute information, such as unit vectors. At 556 the encoder compresses the attribute information and entropy encodes the compressed attribute information (e.g. determined attribute correction values and entropy encodes the determined attribute correction values). To compress the attribute information, at block 558 the encoder selects a mesh vertex for which attribute information is to be compressed. At block 560, the encoder predicts, for the mesh vertex, a unit vector (in 3D), based on one or more other signaled or predicted unit vectors for other mesh vertices. At block 562, the encoder adaptively selects a mapping that maps between a unit sphere in 3D space and 2D parametric coordinates representing locations on the unit sphere in a planar representation based on the predicted unit vector in 3D.

At block 564, the encoder predicts 2D parametric coordinates for the unit vector for the mesh vertex based on other signaled or predicted parametric coordinates proximate to the unit vector to be predicted in the planar representation. At block 566, the encoder maps an actual unit vector included in the received or generated attribute information into 2D parametric coordinates using the adaptively selected mapping. And, at block 568, the encoder determines attribute correction values based on comparing the predicted parametric coordinates and the mapped parametric coordinates of the original unit vector in the received attribute information.

At block 570, the encoder determines if there is an additional mesh vertex for which attribute info is to be compressed. If so the process repeats at 558 to compress an attribute value (e.g. 3D unit vector) for a next mesh vertex. If not at block 572, the determined attribute correction values (e.g. residual values) are entropy encoded. Note that in some embodiments determined attribute correction values may be entropy encoded while other attribute correction values for other mesh vertices are being determined.

Figure 6A:
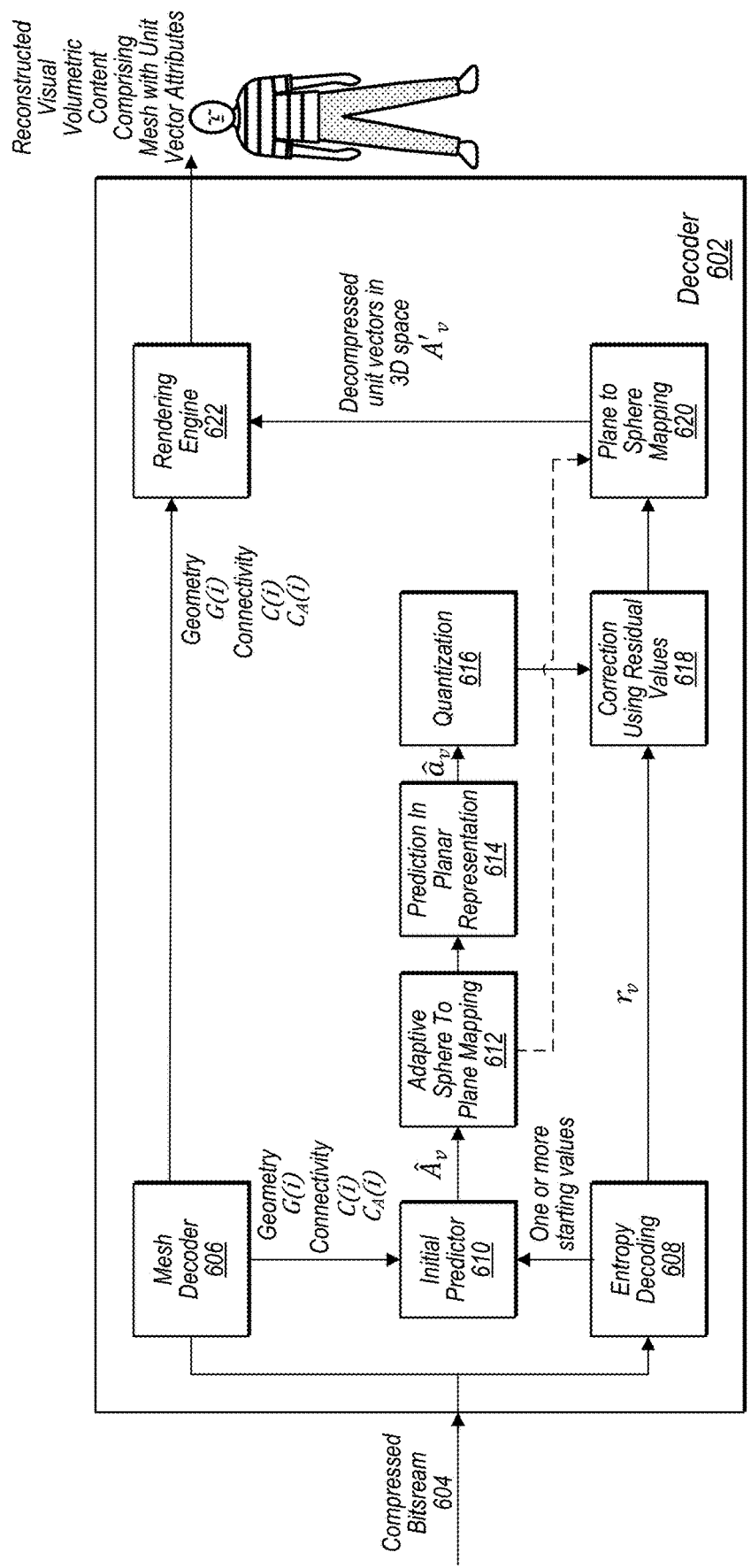
FIG. 6A illustrates an example decoder for decompressing and/or decoding visual volumetric content using adaptively selected mapping, according to some embodiments.

FIG. 6A illustrates an example decoder for decompressing and/or decoding visual volumetric content using adaptively selected mapping according to some embodiments.

In some embodiments, a decoder, such as decoder 602, receives a compressed bit stream 604, which may be a compressed bitstream as generated by encoder 502. The compressed bit stream may include entropy encoded values and an encoded mesh. Mesh decoder 606 decodes the encoded mesh to generate geometry information including mesh vertices G(i) and mesh connectivity C(i). The entropy decoder 608 entropy decodes the entropy encoded residual values and/or entropy encoded starting point attribute values. The signaled starting point attribute values are provided to initial predictor 610 which predicts an attribute value (e.g. unit vector in 3D space). The predicted attribute value is provided to adaptive sphere to plane mapping module 612 for use in selecting a mapping. In some embodiments, mapping selections made at the encoder may be signaled with the residual values and the initial prediction may be skipped and the adaptive sphere to plane mapping module 612 may use the signaled mapping.

Prediction in planar representation module 614 predicts parametric coordinates for the attribute value (unit vector) in 2D in a similar manner as prediction in planar representation module 514 described in FIG. 5A. Quantization module 616 further quantizes the predicted attribute values and adjusts the predicted attribute values (e.g. predicted parametric coordinates for a unit vector) using residual values 618, for example by applying the signaled residual values to the predicted 2D parametric coordinates. Plane to sphere mapping module 620 uses the selected mapping to map the reconstructed 2D parametric coordinates back into a 3D unit vector. In some embodiments, plane to sphere mapping module 620 may further normalize the reconstructed 3D unit vector. The decompressed unit vector in 3D space is used by rendering engine 622 to render a reconstructed version of the compressed visual volumetric content.

Rendering engine 622 receives the decoded mesh information, the decompressed attribute value and uses these received streams to reconstruct the visual volumetric content.

Figure 6B:
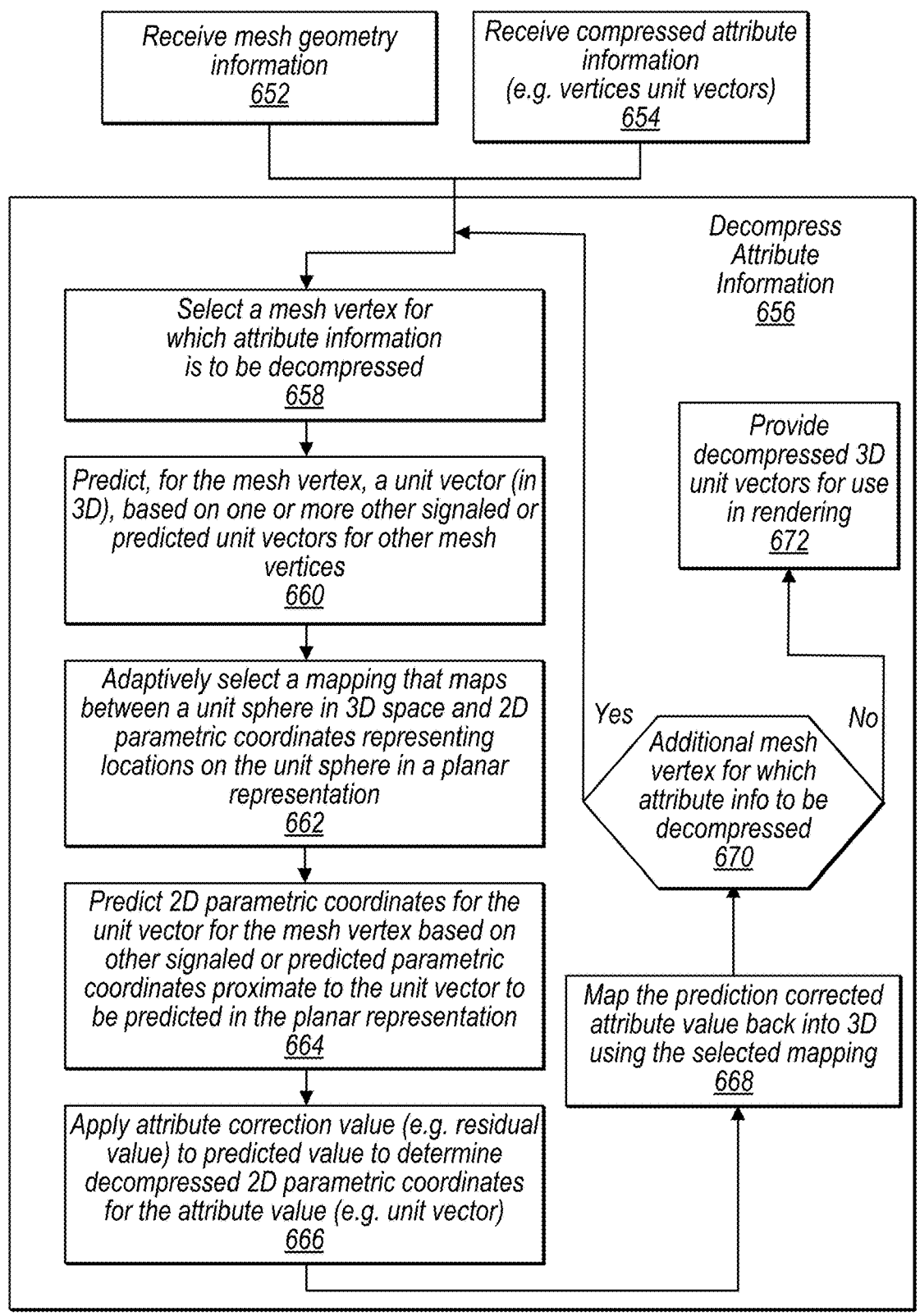
FIG. 6B illustrates an example process for decompressing and/or decoding visual volumetric content using adaptively selected mapping, according to some embodiments.

FIG. 6B illustrates an example process for decompressing and/or decoding visual volumetric content using adaptively selected mappings, according to some embodiments.

At block 652 the decoder receives mesh geometry information such as mesh encoded information that is mesh decoded via mesh decoder 606. At block 654 the decoder receives compressed attribute information such as entropy encoded residual values. Also at blocks 652 the decoder decodes the mesh information and at block 654 entropy decodes the compressed attribute information (e.g. residual values). At block 656 the decoder decompressed the compressed attribute information that has been entropy decoded.

To decompress the compressed attribute information, at block 658 the decoder selects a mesh vertex for which attribute information is to be decompressed. At block 660, the decoder predicts, for the mesh vertex, a unit vector (in 3D), based on one or more other signaled or predicted unit vectors for other mesh vertices. At block 662, the decoder adaptively selects a mapping that maps between a unit sphere in 3D space and 2D parametric coordinates representing locations on the unit sphere in a planar representation. At block 664, the decoder predicts 2D parametric coordinates for the unit vector for the mesh vertex based on other signaled or predicted parametric coordinates proximate to the unit vector to be predicted in the planar representation. At block 666 the decoder applies an attribute correction value (e.g. residual value) to the predicted value to determine decompressed 2D parametric coordinates for the attribute value (e.g. unit vector). At block 668, the decoder maps the prediction corrected attribute value (e.g. 2D parametric coordinates) into a 3D unit vector using the adaptively selected mapping.

At block 670, the decoder determines whether there is an additional mesh vertex for which attribute information is to be decompressed. If so the process repeats for the next mesh vertex, e.g. at block 658. If not the decompressed attribute information including unit vectors in 3D space are provided to a rendering engine at block 672.

Example Multi-Faced Shapes

Figure 7A:
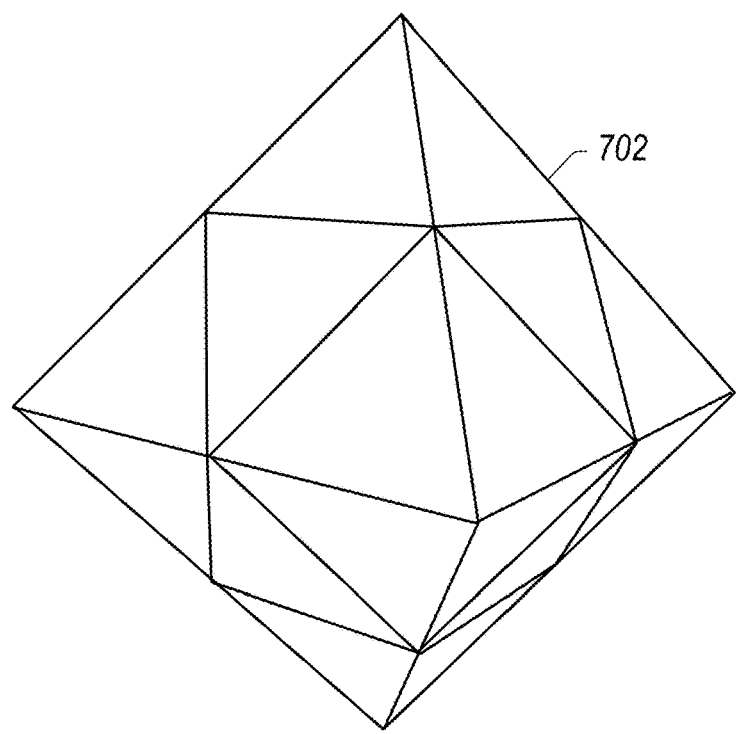
FIGS. 7A and 7B illustrate a subdivided and further subdivided octahedron, for use in adaptively selected mapping, wherein the adaptive selection of the mapping comprises selecting a face of the subdivided octahedron to map a point on the unit sphere to, according to some embodiments.
Figure 7B:
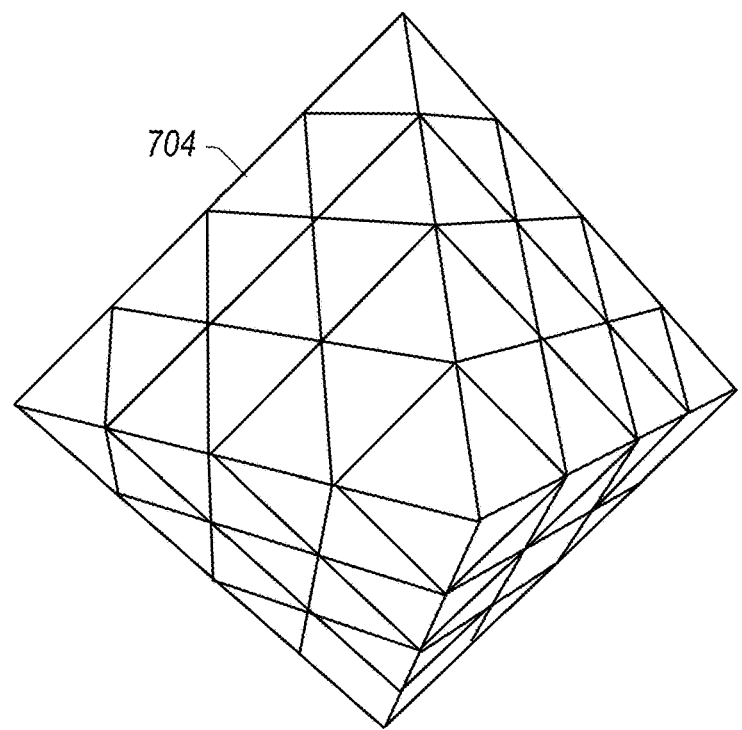

FIGS. 7A and 7B illustrate a subdivided and further subdivided octahedron, for us in adaptively selected mapping, wherein the adaptive selection of the mapping comprises selecting a face of the subdivided octahedron to map a point on the unit sphere to, according to some embodiments.

In some embodiments, the approach described above may further be extended to other shapes having even more faces, such as the sub-divided octahedrons shown in FIGS. 7B and 7C, wherein the eight faces of the octahedron 702 shown in FIG. 7A are divided into five faces per side in FIG. 7B or are even further subdivided into 16 faces per side in FIG. 7C (octahedron 704). In some embodiments, other shapes with multiple faces, such as an authagraph, dodecahedron, icosahedron, truncated icosahedron (e.g. soccer ball shape), etc. may be used. Also in some embodiments, a given shape may be cut and unfolded in different ways. Thus in some embodiments, adaptively selecting a mapping may comprise adaptively selecting a shape and adaptively selecting a mapping including how the shape is cut and unfolded from a 3D representation to a planar representation.

Example More Advanced Mapping for Multi-Faced Shape

FIGS. 8A-8C illustrate a three dimensional dodecahedron and a cut and unfolded two-dimensional version of the dodecahedron, wherein a dodecahedron may be used for selectively mapping between a unit sphere and a planar representation, according to some embodiments.

In some embodiments, to select a mapping from 3D to 2D, let (x, y, z) be a point on the unit sphere and let N(i) be the normal of the face i of the polyhedron and let π(i) be the 2D plane of that face. In order to compute the 2D parametric coordinates of (s, t), given the 3D coordinates of (x, y, z), one of the following options may be selected:

To find the face i on which the point (x, y, z) should be projected
  Compute the signed distance of the point (x, y, z) with respect to all the planes (π(i)). Select the one that has a negative distance. If there are multiples faces meeting this criteria, it means that the point (x, y, z) is on an intersection between two or more faces. In this case one of the following options may be used to select the face,
    the face with the lowest index i could be selected
    any of the intersecting faces could be selected
    any other deterministic or non-deterministic strategy could be used Compute the dot product of (x, y, z) and all N (i). Find the one that leads to the maximum dot product.
Store the centers of each face in an octree structure. Find the center that has the closest distance to (x, y, z). Choose that face.
Map the sphere to a rectangular region by using the octahedron mapping (or any other mapping). Use a 2D grid that indicates for each cell which faces intersect with it. Search only among those faces.
A 2D grid acceleration data structure could be pre-computed or not. For example, FIG. 8C shows a 2D grid acceleration data structure.
Use pre-computed 3D grid (same as the previous one but in 3D). For example the 3D grid is applied to the unit sphere instead of the 2D planar representation.
Use Morton representation to find nearest center
Exploit potential correlations (in time and space) to derive high probability faces. Test the high probability faces based on their probability (e.g., try the ones with the highest probability first) and proceed until one finds the right face, etc.

In some embodiments, once a face is selected, barycentric coordinates can be used to determine the 2D parametric coordinates for the point corresponding to the unit vector when projected onto the selected face.

In some embodiments, in order to compute the 3D coordinates of (x, y, z) given the 2D parametric coordinates of (s,t) the following procedure is followed:

Find the face i on which the point (s,t) should be projected
Use a 2D acceleration structure, which reports for each cell the triangles that intersect with it
The 2D acceleration structure could be computed offline or online.
Search among those faces to find the one that contains the 2D point (s,t)
Other search strategies are possible, such as
  Exploit temporal and special correlations to guide the search process.
  Compute the barycentric coordinates of (s,t)
    Using the barycentric or alternative coordinates together with the 3D coordinates of associated triangle to compute (x, y, z).

Note that the computed (x, y, z) has the right direction/orientation however it is not guaranteed to be located on the sphere. Normalizing the vector (x, y, z) by dividing its components by its 2-norm, guarantees that the point is on the sphere.

In some embodiments, in order to handle the discontinuities introduced by the mapping, a similar strategy is used as was used in the octahedron mapping. In such embodiments, various mappings can be defined based on a favorite direction and the ones used can be adaptively used with a high probability to avoid the discontinuities. In some embodiments, the selection process considers the mapping that guarantees the lowest amount of distortion and discontinuities in a disk centered around the predicted vector. Other strategies could use lower complexity criteria or pre-computed decision tables, which assign for each region of the sphere where the predicted vector is located in a particular corresponding mapping.

Figure 9:
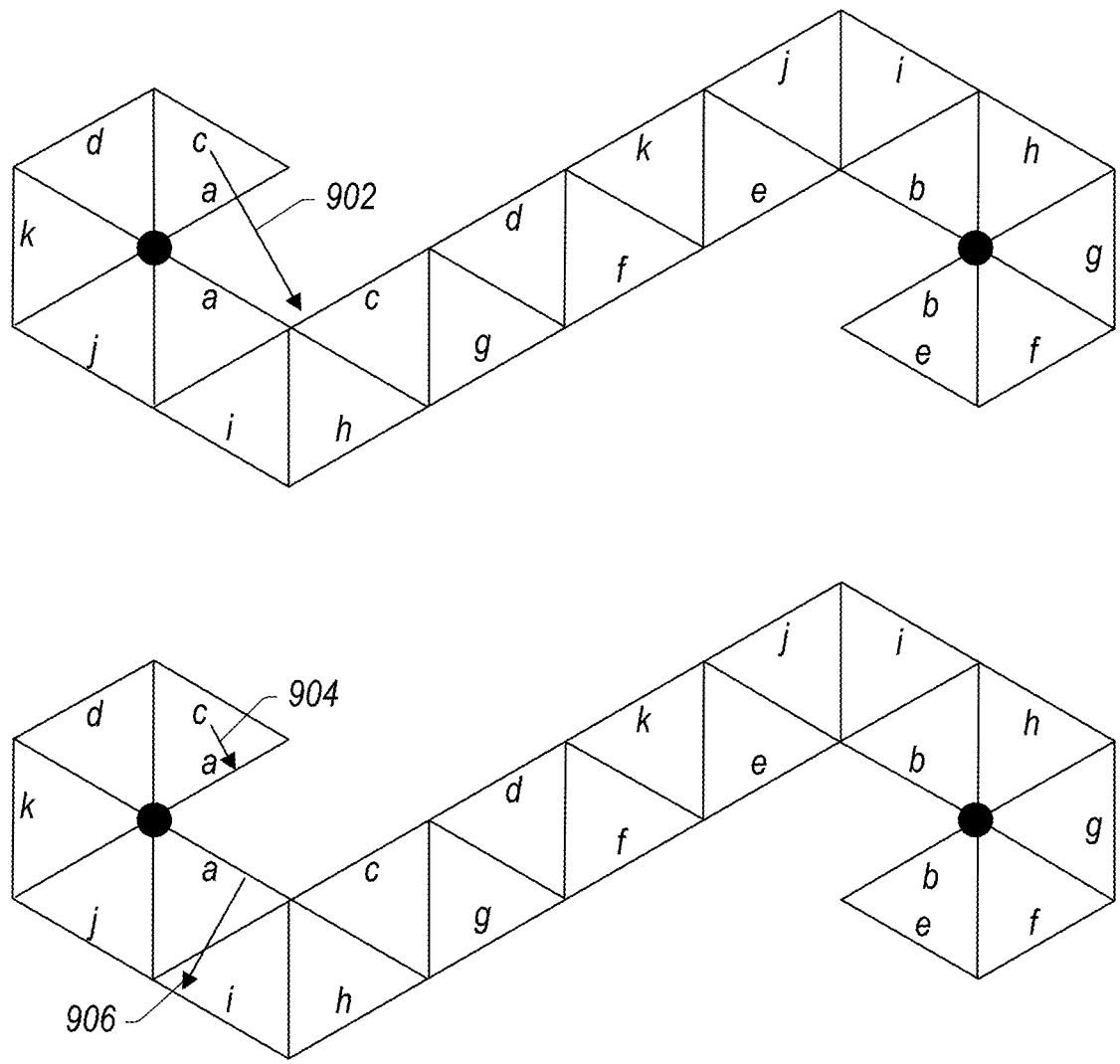
FIG. 9 illustrates a cut and unfolded polyhedral, wherein transforms are used in a selected mapping to jump between unfolded faces and across discontinuities, such as open spaces between the unfolded faces, according to some embodiments.

Another alternative is to compute a globally smooth mapping, where the transition from one 2D patch to another across a boundary could be described by a 2D bijective transform (e.g., rigid transform). For example as shown in FIG. 9. Here, the prediction process exploits the transition functions 902, 904, 906 in order to handle the mapping discontinuities and jump from one face/triangle to the adjacent face, when going thought a seam.

Figure 10:
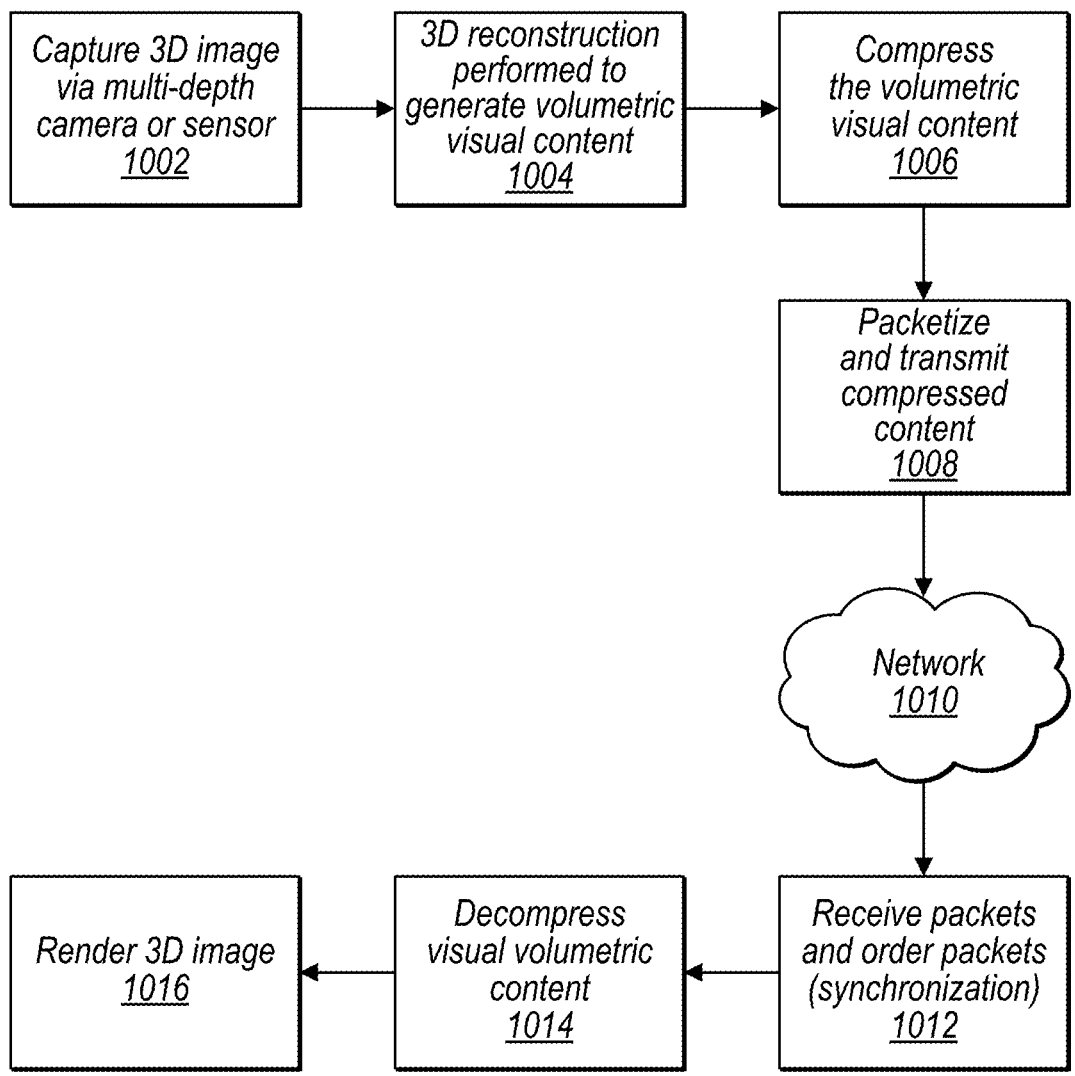
FIG. 10 illustrates compressed volumetric visual content information being used in a 3-D application, according to some embodiments.

Example Applications Using Visual Volumetric Content/ Mesh Encoders and Decoders FIG. 10 illustrates compressed volumetric visual content being used in an application representing a 3-D environment, according to some embodiments.

In some embodiments, an encoder, such as encoder 502 or any of the other encoders described herein, and a decoder, such as decoder 602 or any of the decoders described herein, may be used to communicate volumetric visual content, such as meshes in a 3-D application. For example, a sensor, at 1002, may capture a 3D image and at 1004, the sensor or a processor associated with the sensor may perform a 3D reconstruction based on sensed data to generate volumetric visual content, such as a mesh and associated texture.

At 1006, an encoder such as encoder 502 may compress the volumetric visual content and at 1008 the encoder or a post processor may packetize and transmit the compressed volumetric visual content, via a network 1010. At 1012, the packets may be received at a destination location that includes a decoder, such as decoder 602. The decoder may decompress the compressed volumetric visual content at 1014 and the decompressed volumetric visual content may be rendered at 1016. In some embodiments a 3-D application may transmit volumetric visual content in real time such that a display at 1016 represents images being observed at 1002. For example, a camera in a canyon may allow a remote user to experience walking through a virtual canyon at 1016.

Figure 11:
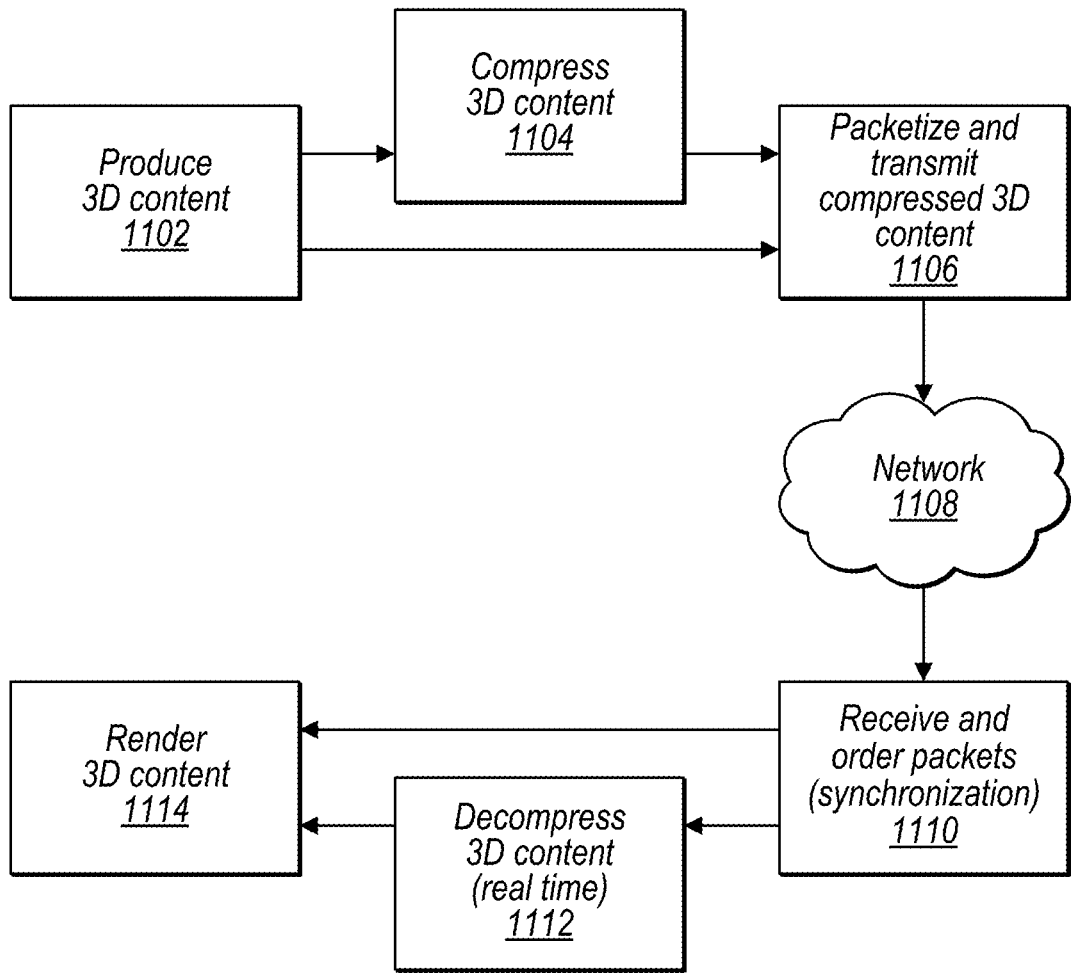
FIG. 11 illustrates compressed volumetric visual content information being used in a virtual reality application, according to some embodiments.

FIG. 11 illustrates compressed volumetric visual content, such as meshes and associated textures being used in a virtual reality (VR) or augmented reality (AR) application, according to some embodiments.

In some embodiments, volumetric visual content may be generated in software (for example as opposed to being captured by a sensor). For example, at 1102 3D visual volumetric content, such as virtual reality or augmented reality content is produced. The 3D visual volumetric content may comprise attribute data and/or mesh data. At 1104, the 3D volumetric visual content may be compressed and at 1106 the compressed 3D volumetric visual content data may be packetized and transmitted via a network 1108. For example, 3D visual volumetric content produced at 1102 may be produced at a remote server and communicated to a content consumer via network 1108. At 1110, the packets may be received and synchronized at the content consumer's device. A decoder operating at the content consumer's device may decompress the compressed volumetric visual content at 1112 and the decompressed visual volumetric content may be rendered in real time, for example in a head mounted display of the content consumer's device or another type of display. In some embodiments, visual volumetric content may be generated, compressed, decompressed, and rendered responsive to a VR or AR consumer manipulating the head mounted display to look in different directions.

In some embodiments, visual volumetric content compression and decompression as described herein may be used in various other applications, such as geographic information systems, sports replay broadcasting, museum displays, autonomous navigation, etc.

Example Computer System

Figure 12:
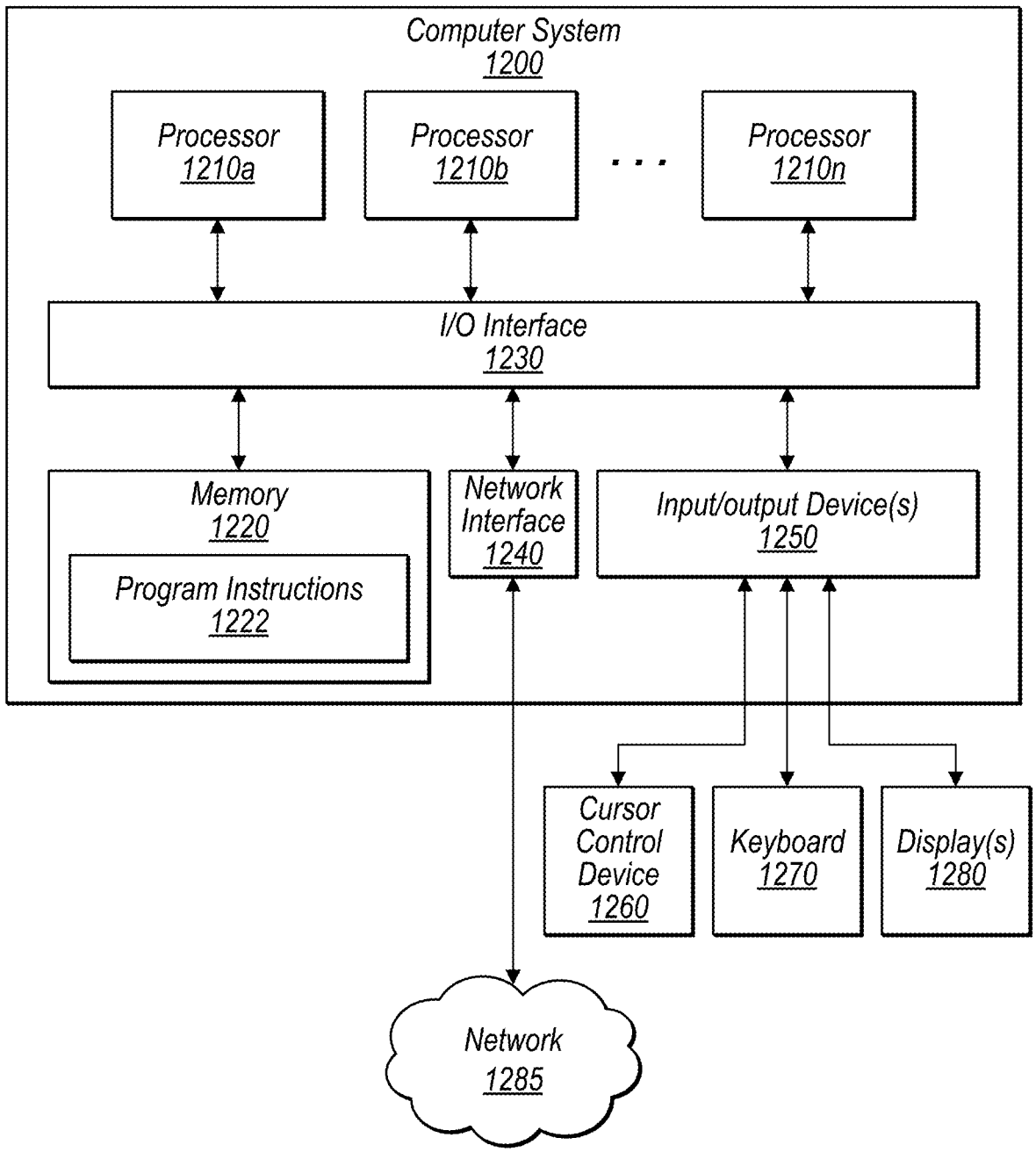
FIG. 12 illustrates an example computer system that may implement an encoder or decoder, according to some embodiments.

FIG. 12 illustrates exemplary computer system 1200 usable to implement an encoder or decoder as described above with reference to FIGS. 1-11). In different embodiments, computer system 1200 may be any of various types of devices, including, but not limited to, a personal computer system, desktop computer, laptop, notebook, tablet, slate, pad, or netbook computer, handheld computer, workstation, network computer, a camera, a set top box, a mobile device, a consumer device, video game console, handheld video game device, application server, storage device, a television, a video recording device, a peripheral device such as a switch, modem, router, or in general any type of computing or electronic device.

Various embodiments of an encoder or decoder, as described herein may be executed using one or more computer systems 1200, which may interact with various other devices. Note that any component, action, or functionality described above with respect to FIGS. 1-11 may be implemented using one or more computers such as computer system 1200 of FIG. 12, according to various embodiments. In the illustrated embodiment, computer system 1200 includes one or more processors 1210 coupled to a system memory 1220 via an input/output (I/O) interface 1230. Computer system 1200 further includes a network interface 1240 coupled to I/O interface 1230, and one or more input/output devices 1250, such as cursor control device 1260, keyboard 1270, and display(s) 1280. In some embodiments, computer system 1200 may be implemented as a system on a chip (SoC). For example, in some embodiments, processors 1210, memory 1220, I/O interface 1230 (e.g. a fabric), etc. may be implemented in a single SoC comprising multiple components integrated into a single chip. For example an SoC may include multiple CPU cores, a multi-core GPU, a multi-core neural engine, cache, one or more memories, etc. integrated into a single chip. In some embodiments, an SoC embodiment may implement a reduced instruction set computing (RISC) architecture, or any other suitable architecture.

System memory 1220 may be configured to store compression or decompression program instructions 1222 and/or sensor data accessible by processor 1210. In various embodiments, system memory 1220 may be implemented using any suitable memory technology, such as static random access memory (SRAM), synchronous dynamic RAM (SDRAM), nonvolatile/Flash-type memory, or any other type of memory. In the illustrated embodiment, program instructions 1222 may be configured to implement an encoder or decoder application incorporating any of the functionality described above. In some embodiments, program instructions and/or data may be received, sent or stored upon different types of computer-accessible media or on similar media separate from system memory 1220 or computer system 1200.

In one embodiment, I/O interface 1230 may be configured to coordinate I/O traffic between processor 1210, system memory 1220, and any peripheral devices in the device, including network interface 1240 or other peripheral interfaces, such as input/output devices 1250. In some embodiments, I/O interface 1230 may perform any necessary protocol, timing or other data transformations to convert data signals from one component (e.g., system memory 1220) into a format suitable for use by another component (e.g., processor 1210). In some embodiments, I/O interface 1230 may include support for devices attached through various types of peripheral buses, such as a variant of the Peripheral Component Interconnect (PCI) bus standard or the Universal Serial Bus (USB) standard, for example. In some embodiments, the function of I/O interface 1230 may be split into two or more separate components, such as a north bridge and a south bridge, for example. Also, in some embodiments some or all of the functionality of I/O interface 1230, such as an interface to system memory 1220, may be incorporated directly into processor 1210.

Network interface 1240 may be configured to allow data to be exchanged between computer system 1200 and other devices attached to a network 1285 (e.g., carrier or agent devices) or between nodes of computer system 1200. Network 1285 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 1240 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1250 may, in some embodiments, include one or more display terminals, keyboards, keypads, touchpads, scanning devices, voice or optical recognition devices, or any other devices suitable for entering or accessing data by one or more computer systems 1200. Multiple input/output devices 1250 may be present in computer system 1200 or may be distributed on various nodes of computer system 1200. In some embodiments, similar input/output devices may be separate from computer system 1200 and may interact with one or more nodes of computer system 1200 through a wired or wireless connection, such as over network interface 1240.

As shown in FIG. 12, memory 1220 may include program instructions 1222, which may be processor-executable to implement any element or action described above. In one embodiment, the program instructions may implement the methods described above. In other embodiments, different elements and data may be included.

Computer system 1200 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1200 may be transmitted to computer system 1200 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A non-transitory computer-readable medium storing program instructions that, when executed using one or more processors, cause the one or more processors to:
   receive, or generate, attribute information for volumetric visual content, wherein the attribute information comprises unit vectors associated with respective vertices in geometry information; and
   for respective ones of the vertices, select a mapping for mapping a unit vector into 2D parametric coordinates of a planar representation of a unit sphere,
      wherein the mapping is selected such that a point on the unit sphere corresponding to the unit vector is located proximate to an origin point in the planar representation and away from discontinuous or distorted portions of the unit sphere in the planar representation; and
   compress the attribute information based on the selected mappings for the respective ones of the vertices.

2. The non-transitory, computer-readable medium of claim 1, wherein to compress the attribute information, for the respective ones of the vertices, the program instructions cause the one or more processors to:
   predict 2D parametric coordinates for the unit vector for the vertex based on other signaled or predicted parametric coordinates for other unit vectors neighboring the unit vector in the planar representation of the unit sphere;
   map, using the selected mapping, an original version of the unit vector included in the received or generated attribute information into 2D parametric coordinates; and
   determine an attribute correction value for the predicted 2D parametric coordinates for the vertex based on a difference between the predicted 2D parametric coordinates and the 2D parametric coordinates of the original version of the unit vector that has been mapped into the planar representation according to the selected mapping.

3. The non-transitory, computer-readable medium of claim 2, wherein the program instructions, when executed using the one or more processors, further cause the one or more processors to:
   entropy encode the determined attribute correction values for the parametric coordinates for unit vectors for the respective ones of the vertices.

4. The non-transitory, computer-readable medium of claim 2, wherein to predict the 2D parametric coordinates, the program instructions, when executed using the one or more processors, further cause the one or more processors to:
   adaptively select a prediction technique to use to perform the prediction from a set of prediction techniques comprising two or more of:
      an orthogonal projection technique with signaled orthogonal projection direction sign;
      an orthogonal projection technique without signaled orthogonal projection direction sign;
      a parallelogram prediction technique;
      a linear prediction technique;
      an average prediction technique; or
      a delta prediction technique.

5. The non-transitory, computer-readable medium of claim 1, wherein the program instructions, when executed using the one or more processors, further cause the one or more processors to:
   receive, or generate, the geometry information, wherein the geometry information is mesh geometry information comprising vertices information and connectivity information for a geometric mesh representation of the volumetric visual content.

6. The non-transitory, computer-readable medium of claim 1, wherein to select the mapping, the program instructions, when executed using the one or more processors, further cause the one or more processors to:
   select a shape approximating the unit sphere to be used for the mapping, wherein the selected shape is cut or unfolded to generate the planar representation.

7. The non-transitory, computer-readable medium of claim 6 wherein the selected shape is selected from a set of shapes comprising two or more of:
   an octahedron approximating the unit sphere;
   a sub-divided octahedron approximating the unit sphere, wherein respective faces of the octahedron are divided into two or more triangles;
   an authagraph approximating the unit sphere;
   a dodecahedron approximating the unit sphere;
   an icosahedron approximating the unit sphere; or
   a truncated icosahedron approximating the unit sphere.

8. A device, comprising:
   a memory storing program instructions; and
   one or more processors, wherein the program instructions when executed using the one or more processors, cause the one or more processors to:
      receive, or generate, attribute information for volumetric visual content, wherein the attribute information comprises unit vectors associated with respective vertices in geometry information; and
      for respective ones of the vertices, select a mapping for mapping a unit vector into 2D parametric coordinates of a planar representation of a unit sphere,
         wherein the mapping is selected such that a point on the unit sphere corresponding to the unit vector is located proximate to an origin point in the planar representation and away from discontinuous or distorted portions of the unit sphere in the planar representation; and
      compress the attribute information based on the selected mappings for the respective ones of the vertices.

9. The device of claim 8, wherein to select the mapping, the program instructions, when executed using the one or more processors, cause the one or more processors to:
   select an orientation for a shape approximating the unit sphere used in the mapping, wherein the shape approximates the unit sphere and is cut or unfolded to generate the planar representation.

10. The device of claim 9, wherein the shape approximating the unit sphere comprises a plurality of faces, and
   wherein to select the mapping, the program instructions, when executed using the one or more processors, further cause the one or more processors to:
   select a face of the shape approximating the unit sphere on to which the point on the unit sphere corresponding to a predicted unit vector is to be projected, wherein the orientation of the shape approximating the unit sphere is selected such that the point is projected onto the selected face, and
   wherein to select the face, the program instructions, when executed using the one or more processors, further cause the one or more processors to:
   select the face based on a signed distance of the point on the unit sphere with respect to respective planes corresponding to each of the faces of the shape approximating the unit sphere;
   select the face based on a computed dot product of the predicted unit vector and normal vectors for the respective planes corresponding to each of the faces of the shape approximating the unit sphere; or
   select the face based on searching an octree structure that stores center locations in 3D space for each face, wherein a face having a closest center location to the predicted unit vector is selected.

11. The device of claim 10, wherein to select the face the program instructions, when executed using the one or more processors, further cause the one or more processors to:
   map the point on the unit sphere to a region in 3D space; and
   limit a search of faces onto which to project the point to a set of faces of the shape approximating the unit sphere that reside in the region into which the point on the unit sphere is mapped.

12. The device of claim 10, wherein the plurality of faces comprise one or more triangles, and wherein to perform the mapping the program instructions, when used by the one or more processors cause the one or more processors to:
   project the point on the unit sphere into a given one of the triangles of the selected face; and
   compute the parametric coordinates as barycentric coordinates in reference to the given triangle of the selected face.

13. The device of claim 8, wherein the mapping comprises a mapping that maps the point on the unit sphere to a point on an octahedron that approximates the unit sphere, wherein the octahedron is cut and unfolded into the planar representation, and wherein to select the mapping, the program instructions, when executed using the one or more processors, further cause the one or more processors to:
select an orientation of the octahedron such that the point on the unit sphere is projected onto the point on the octahedron at a location proximate to an origin of the octahedron and away from cut portions of the octahedron when the octahedron is cut and unfolded into the planar representation.

14. The device of claim 13, wherein to select the orientation of the octahedron, the program instructions, when executed using the one or more processors, further cause the one or more processors to:
select the orientation such that the origin point is along a positive x-axis in 3D space based on a positive x-component of a predicted unit vector being greater than an absolute value of a y-component or an absolute value of a z-component of the predicted unit vector;
select the orientation such that the origin point is along a negative x-axis in 3D space based on a negative x-component of the predicted unit vector being greater than an absolute value of a y-component or an absolute value of a z-component of the predicted unit vector;
select the orientation such that the origin point is along a positive y-axis in 3D space based on a positive x-component of the predicted unit vector being greater than an absolute value of a z-component or an absolute value of a z-component of the predicted unit vector;
select the orientation such that the origin point is along a negative y-axis in 3D space based on a negative y-component of the predicted unit vector being greater than an absolute value of a x-component or an absolute value of a z-component of the predicted unit vector;
select the orientation such that the origin point is along a positive z-axis in 3D space based on a positive z-component of the predicted unit vector being greater than an absolute value of a x-component or an absolute value of a y-component of the predicted unit vector; or
select the orientation such that the origin point is along a negative z-axis in 3D space based on a negative z-component of the predicted unit vector being greater than an absolute value of a x-component or an absolute value of a y-component of the predicted unit vector.

15. A non-transitory computer-readable medium storing program instructions that, when executed using one or more processors, cause the one or more processors to:
receive geometry information for volumetric visual content, wherein the geometry information comprises vertices information and connectivity information for a geometric representation of the volumetric visual content;
receive attribute information indicating 2D parametric coordinates for vertices of the geometric representation; and
for respective ones of the vertices of the geometric representation:
select a mapping for mapping a unit vector into 2D parametric coordinates of a planar representation comprising a planar representation of a unit sphere; and
map the 2D parametric coordinates into 3D space using the selected mapping to generate a decompressed version of the unit vector for the vertex.

16. The non-transitory, computer-readable medium of claim 15, wherein the geometry information is mesh geometry information,
wherein the attribute information is compressed attribute information comprising correction values for the unit vectors associated with the respective ones of the vertices of the geometric representation, and
wherein, for the respective ones of the vertices of the of the geometric representation, the program instructions cause the one or more processors to:
predict 2D parametric coordinates for the unit vector for the vertex based on other signaled or predicted parametric coordinates for other unit vectors neighboring the unit vector to be predicted in the planar representation of the unit sphere; and
apply an attribute correction value for the predicted 2D parametric coordinates for the vertex to generate decompressed 2D parametric coordinates for the vertex.

17. The non-transitory, computer-readable medium of claim 15, wherein the program instructions, when executed using the one or more processors, further cause the one or more processors to:
for respective ones of the vertices of the geometric representation:
normalize the decompressed version of the unit vector by dividing x, y, and, z components of the decompressed version of the unit vector by an Euclidean length of the decompressed version of the unit vector.

18. The non-transitory, computer-readable medium of claim 15, wherein the attribute information further comprises mapping selection indicators for the respective vertices,
wherein to adaptively select the mapping, the program instructions cause the one or more processors to:
select respective mappings for the respective vertices, based on the corresponding mapping selection indicators for the respective vertices included in the attribute information.

19. The non-transitory, computer-readable medium of claim 15, wherein to adaptively select the mapping, the program instructions cause the one or more processors to:
predict a corresponding unit vector for the vertex based on one or more other signaled or predicted unit vectors for one or more other ones of the vertices; and
adaptively select respective mappings for the respective vertices such that a point on the unit sphere corresponding to the predicted unit vector is located proximate to an origin point in the planar representation and away from discontinuous or distorted portions of the unit sphere in the planar representation.

20. The non-transitory, computer-readable medium of claim 15, wherein to adaptively select the mapping, the program instructions, when executed using the one or more processors, further cause the one or more processors to:
adaptively select an orientation for a shape approximating the unit sphere used in the mapping, wherein the shape approximates the unit sphere and is cut or unfolded to generate the planar representation.

* * * * *